(12) United States Patent
Nakamizo et al.

(10) Patent No.: US 10,637,712 B2
(45) Date of Patent: Apr. 28, 2020

(54) TRANSCEIVER

(71) Applicant: Mitsubishi Electric Corporation, Tokyo (JP)

(72) Inventors: Hideyuki Nakamizo, Tokyo (JP); Kenichi Tajima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/465,506

(22) PCT Filed: Dec. 19, 2016

(86) PCT No.: PCT/JP2016/087779
§ 371 (c)(1),
(2) Date: May 30, 2019

(87) PCT Pub. No.: WO2018/116346
PCT Pub. Date: Jun. 28, 2018

(65) Prior Publication Data
US 2020/0067757 A1 Feb. 27, 2020

(51) Int. Cl.
*H04L 27/36* (2006.01)
*H04L 27/227* (2006.01)
*H04B 1/40* (2015.01)
*H04L 27/38* (2006.01)
*H04L 27/20* (2006.01)

(52) U.S. Cl.
CPC .......... *H04L 27/364* (2013.01); *H04B 1/40* (2013.01); *H04L 27/20* (2013.01); *H04L 27/2273* (2013.01); *H04L 27/38* (2013.01)

(58) Field of Classification Search
CPC .... H04L 5/14; H04L 27/368; H04B 10/50572; H04B 10/516; H04B 10/58; H03D 3/007
USPC ........................................................ 375/296
See application file for complete search history.

(56) References Cited

U.S. PATENT DOCUMENTS

| | | | | |
|---|---|---|---|---|
| 5,864,586 A | * | 1/1999 | Kato | H04B 1/405 375/297 |
| 8,036,619 B2 | * | 10/2011 | Heinonen | H03B 5/1203 455/255 |
| 8,099,058 B1 | * | 1/2012 | Morris | H04B 17/14 375/141 |
| 2004/0087279 A1 | * | 5/2004 | Muschallik | H04B 1/30 455/73 |

OTHER PUBLICATIONS

Kanar et al., "A 2-15 GHz Built-in-Self-Test System for Wide-band Phased Arrays Using Self-Correcting 8-State I/Q Mixers", IEEE IMS2016, total 4 pages.

(Continued)

*Primary Examiner* — Leila Malek
(74) *Attorney, Agent, or Firm* — Birch, Stewart, Kolasch & Birch, LLP

(57) ABSTRACT

Included are a first signal exchanger for exchanging a TXI signal and a TXQ signal output from a transmission baseband unit to signal paths and a TX control unit for controlling generation of the TXI signal and the TXQ signal in the transmission baseband unit on the basis of a measurement result of a reception baseband unit before and after exchange of the signals by the first signal exchanger. As a result, a transceiver only needs to have a single local signal generating unit mounted thereon as a local signal generating unit that is an analog circuit.

13 Claims, 7 Drawing Sheets

(56) References Cited

OTHER PUBLICATIONS

Mayer et al., "A direct-conversion transmitter for small-cell cellular base stations with integrated digital predistortion in 65nm CMOS", 2016 IEEE Radio Frequency Integrated Circuits Symposium, pp. 63-66.

McLaurin et al., "A Direct-Conversion Receiver for Multi-Carrier 3G/4G Small-Cell Base Stations in 65nm CMOS", Frequency Integrated Circuits Symposium, pp. 71-74.

* cited by examiner

TRANSCEIVER

TECHNICAL FIELD

The present invention relates to a transceiver for transmitting and receiving a high frequency signal.

BACKGROUND ART

The following Non-Patent Literature 1 discloses a transceiver for transmitting and receiving a high frequency signal.

This transceiver includes a transmission baseband unit, a quadrature modulator, a quadrature demodulator, and a reception baseband unit.

The quadrature modulator includes a transmission local signal generating unit, and the quadrature demodulator includes a reception local signal generating unit.

The transmission local signal generating unit generates a transmission local signal having the same frequency as a carrier frequency.

The reception local signal generating unit generates a reception local signal having a different frequency from the transmission local signal.

The quadrature modulator includes a 90° phase difference generating unit for outputting a first transmission local signal having the same frequency as the transmission local signal generated by the transmission local signal generating unit from a terminal, a, and outputting a second transmission local signal having a phase ahead of the first transmission local signal by 90° from a terminal, b.

Using the first transmission local signal generated by the 90° phase difference generating unit, the quadrature modulator converts the frequency of a transmission I-phase signal (hereinafter referred to as "TXI signal") of a transmission baseband signal output from the transmission baseband unit.

In addition, using the second transmission local signal generated by the 90° phase difference generating unit, the quadrature modulator converts the frequency of a transmission Q-phase signal (hereinafter referred to as "TXQ signal") of the transmission baseband signal.

Then, the quadrature modulator synthesizes the frequency-converted transmission I-phase signal with the frequency-converted transmission Q-phase signal, and outputs a high frequency signal (hereinafter referred to as "TXO signal") which is a synthesized signal thereof.

However, when there is a difference between a frequency characteristic of a path through which the TXI signal is transmitted from the transmission baseband unit to the quadrature modulator and a frequency characteristic of a path through which the TXQ signal is transmitted from the transmission baseband unit to the quadrature modulator, an image component may be generated in the TXO signal, and a communication characteristic of the TXO signal may be deteriorated. The frequency characteristic of a path corresponds to a passing loss in the path, a passing phase in the path, or the like.

The transceiver disclosed in Non-Patent Literature 1 has a function of correcting a difference between a frequency characteristic of a path through which the TXI signal is transmitted and a frequency characteristic of a path through which the TXQ signal is transmitted.

The transceiver disclosed in Non-Patent Literature 1 corrects the difference between the frequency characteristic of a path through which the TXI signal is transmitted and the frequency characteristic of a path through which the TXQ signal is transmitted in the following manner.

The quadrature demodulator of the transceiver includes the 90° phase difference generating unit for outputting a first reception local signal having the same frequency as the reception local signal generated by the reception local signal generating unit from a terminal a and outputting a second reception local signal having a phase ahead of the first reception local signal by 90° from a terminal b.

Using the first reception local signal generated by the 90° phase difference generating unit, the quadrature demodulator converts the frequency of the TXO signal output from the quadrature modulator and outputs the frequency-converted TXO signal as a reception I-phase signal (hereinafter referred to as "RXI signal").

In addition, using the second reception local signal generated by the 90° phase difference generating unit, the quadrature demodulator converts the frequency of the TXO signal output from the quadrature modulator and outputs the frequency-converted TXO signal as a reception Q-phase signal (hereinafter referred to as "RXQ signal").

The reception baseband unit of the transceiver measures the RXI signal and the RXQ signal output from the quadrature demodulator.

The transmission baseband unit of the transceiver calculates a difference between a frequency characteristic of a path through which a TXI signal is transmitted and a frequency characteristic of a path through which a TXQ signal is transmitted, from the RXI signal and the RXQ signal measured by the reception baseband unit.

The frequency of a reception local signal generated by the reception local signal generating unit is offset with respect to a transmission local signal generated by the transmission local signal generating unit, and therefore the transmission baseband unit can calculate a difference between the frequency characteristics of the two paths.

The transmission baseband unit corrects the difference between the frequency characteristics of the paths on the basis of the calculation result of the difference between the frequency characteristics of the two paths.

CITATION LIST

Non-Patent Literature

Non-Patent Literature 1: Chris Mayer, David McLaurin, Jason Fan, Steve Bal, Chris Angell, Oliver Gysel, Martin McCormick, Manish Manglani, Rich Schubert, Brian Reggiannini, John Kornblum, Lu Wu, Lex Leonard, Shipra Bhal, Alex Kagan, and Tony Montalvo, "A Direct-Conversion Transmitter for Small-Cell Cellular Base Stations with Integrated Digital Predistortion in 65 nm CMOS" IEEE RFIC2016.

SUMMARY OF INVENTION

Technical Problem

Since a conventional transceiver is configured as described above, it is possible to calculate the difference between the frequency characteristics of the two paths, but it is necessary to generate a reception local signal having a frequency offset with respect to a transmission local signal. For this reason, it is necessary to separately mount the transmission local signal generating unit and the reception local signal generating unit, each of the transmission local signal generating unit and the reception local signal generating unit is an analog circuit, and therefore the circuit scale of the analog circuit increases disadvantageously. In addition, a transmission local signal and a reception local signal interfere with each other, and a communication characteristic may be deteriorated disadvantageously.

The present invention has been achieved in order to solve the above problems, and an object of the present invention is to obtain a transceiver capable of reducing the circuit scale of an analog circuit and preventing deterioration of a communication characteristic due to interference between a transmission local signal and a reception local signal.

Solution to Problem

A transceiver according to the present invention includes: a local signal generating unit for generating a local signal; a transmission baseband unit for generating a transmission I-phase signal and a transmission Q-phase signal of a transmission wave, outputting the transmission I-phase signal to a first path, and outputting the transmission Q-phase signal to a second path; a quadrature modulator for performing quadrature modulation on the transmission I-phase signal that has passed through the first path and the transmission Q-phase signal that has passed through the second path using the local signal to generate a high frequency signal from the transmission I-phase signal after the quadrature modulation and the transmission Q-phase signal after the quadrature modulation; a quadrature demodulator for performing quadrature demodulation on the high frequency signal using the local signal to generate a reception I-phase signal and a reception Q-phase signal, outputting the reception I-phase signal to a third path, and outputting the reception Q-phase signal to a fourth path; a reception baseband unit for measuring the reception I-phase signal that has passed through the third path and the reception Q-phase signal that has passed through the fourth path; a first signal exchanger for exchanging the transmission I-phase signal and the transmission Q-phase signal output from the transmission baseband unit to the first and second paths; and a control unit for controlling generation of the transmission I-phase signal and the transmission Q-phase signal in the transmission baseband unit on the basis of a measurement result of the reception baseband unit before and after the exchange of the signals by the first signal exchanger.

Advantageous Effects of Invention

According to the present invention, it is configured to include the first signal exchanger for exchanging the transmission I-phase signal and the transmission Q-phase signal output from the transmission baseband unit to the first and second paths, and to include the control unit for controlling generation of the transmission I-phase signal and the transmission Q-phase signal in the transmission baseband unit on the basis of a measurement result of the reception baseband unit before and after the exchange of the signals by the first signal exchanger. Therefore, it is possible to reduce the circuit scale of an analog circuit and to prevent deterioration of a communication characteristic due to interference between a transmission local signal and a reception local signal.

DESCRIPTION OF EMBODIMENTS

Hereinafter, in order to describe the present invention in more detail, embodiments for carrying out the present invention will be described with reference to the attached drawings.

First Embodiment

Figure 1:
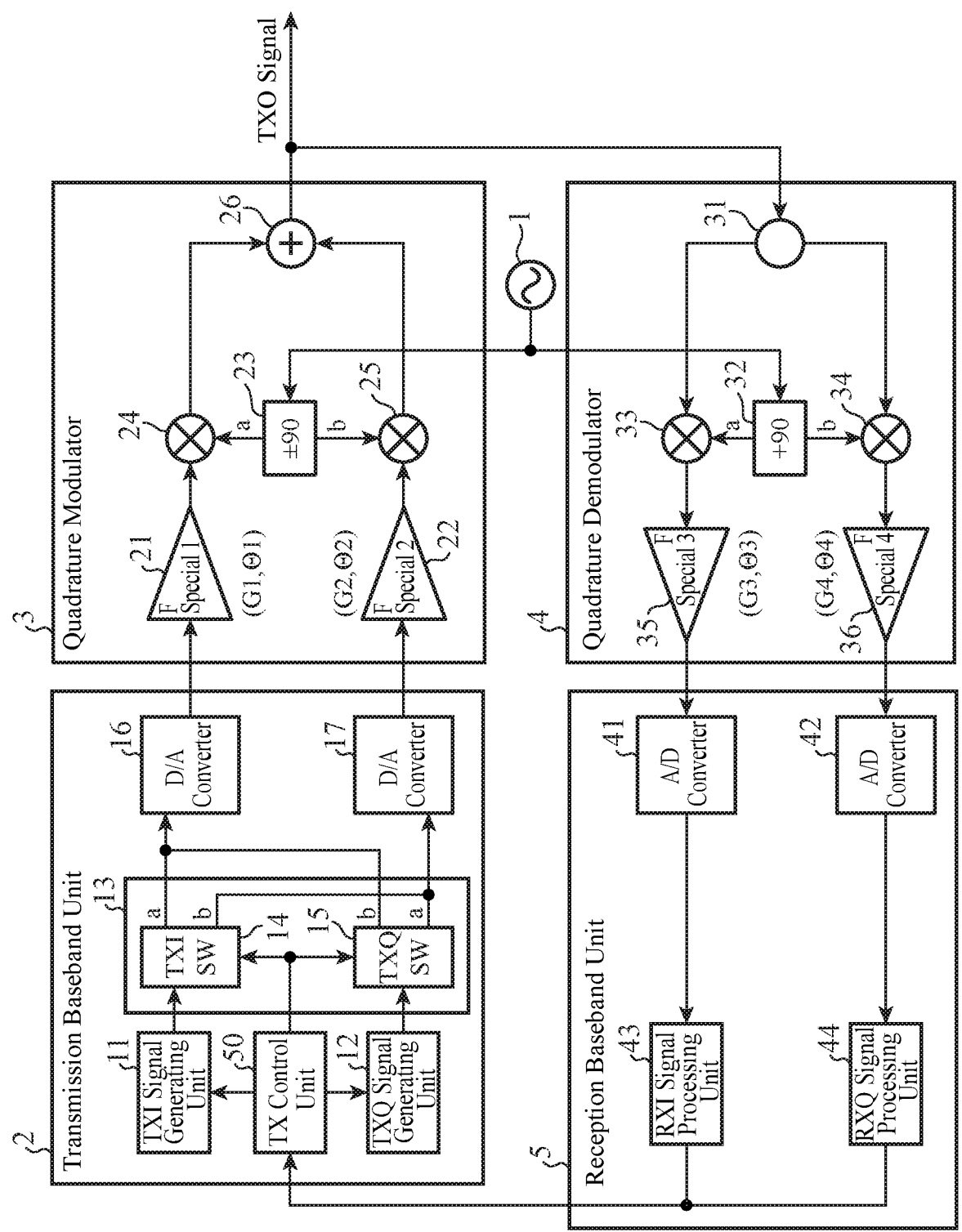
FIG. 1 is a configuration diagram illustrating a transceiver according to a first embodiment of the present invention.

FIG. 1 is a configuration diagram illustrating a transceiver according to a first embodiment of the present invention.

In FIG. 1, a local signal generating unit 1 is an analog circuit for generating a local signal and outputting the local signal to a quadrature modulator 3 and a quadrature demodulator 4.

A transmission baseband unit 2 generates a transmission I-phase signal (hereinafter referred to as "TXI signal") and a transmission Q-phase signal (hereinafter referred to as "TXQ signal") of a transmission wave.

In addition, the transmission baseband unit 2 performs digital-analog conversion (hereinafter referred to as "D/A conversion") on the TXI signal and the TXQ signal, outputs the TXI signal which is an analog signal to a signal path 21 or a signal path 22, and outputs the TXQ signal which is an analog signal to the signal path 22 or the signal path 21.

The quadrature modulator 3 is an analog circuit for performing quadrature modulation on the TXI signal that has passed through the signal path 21 and the TXQ signal that has passed through the signal path 22 using the local signal output from the local signal generating unit 1.

In addition, the quadrature modulator 3 generates a high frequency signal (hereinafter referred to as "TXO signal") from the TXI signal after quadrature modulation and the TXQ signal after quadrature modulation, and outputs the TXO signal.

The quadrature demodulator 4 is an analog circuit for performing quadrature demodulation on the TXO signal generated by the quadrature modulator 3 using the local signal output from the local signal generating unit 1 to generate a reception I-phase signal (hereinafter referred to as "RXI signal") and a reception Q-phase signal (hereinafter referred to as "RXQ signal").

The quadrature demodulator 4 outputs the RXI signal to a signal path 35 and outputs the RXQ signal to a signal path 36.

A reception baseband unit 5 performs analog-digital conversion (hereinafter referred to as "A/D conversion") on the RXI signal that has passed through the signal path 35, and performs A/D conversion on the RXQ signal that has passed through the signal path 36.

In addition, the reception baseband unit 5 measures the RXI signal which is a digital signal, and measures the RXQ signal which is a digital signal.

A TXI signal generating unit 11 of the transmission baseband unit 2 is a transmission I-phase signal generating unit for generating a TXI signal of a transmission wave and outputting the TXI signal to a TXISW 14 of a first signal exchanger 13.

A TXQ signal generating unit 12 of the transmission baseband unit 2 is a transmission Q-phase signal generating unit for generating a TXQ signal of a transmission wave and outputting the TXQ signal to a TXQSW 15 of the first signal exchanger 13.

The first signal exchanger 13 includes the TXISW 14 and the TXQSW 15.

The first signal exchanger 13 exchanges the TXI signal and the TXQ signal output from the transmission baseband unit 2 to the signal path 21 and the signal path 22.

That is, if a command output from a TX control unit 50 indicates that a signal is to be output from a terminal a of the TXISW 14 or the TXQSW 15, the first signal exchanger 13 outputs the TXI signal generated by the TXI signal generating unit 11 to a D/A converter 16, and outputs the TXQ signal generated by the TXQ signal generating unit 12 to a D/A converter 17.

If the command output from the TX control unit 50 indicates that a signal is to be output from a terminal b of the TXISW 14 or the TXQSW 15, the first signal exchanger 13 outputs the TXI signal generated by the TXI signal generating unit 11 to the D/A converter 17, and outputs the TXQ signal generated by the TXQ signal generating unit 12 to the D/A converter 16.

The TXISW 14 is a first path switching unit in which the terminal a is connected to an input terminal of the D/A converter 16 and the terminal b is connected to an input terminal of the D/A converter 17.

If the command output from the TX control unit 50 indicates that a signal is to be output from the terminal a, the TXISW 14 outputs the TXI signal generated by the TXI signal generating unit 11 from the terminal a to the D/A converter 16.

If the command output from the TX control unit 50 indicates that a signal is to be output from the terminal b, the TXISW 14 outputs the TXI signal generated by the TXI signal generating unit 11 from the terminal b to the D/A converter 17.

The TXQSW 15 is a second path switching unit in which the terminal a is connected to the input terminal of the D/A converter 17 and the terminal b is connected to the input terminal of the D/A converter 16.

If the command output from the TX control unit 50 indicates that a signal is to be output from the terminal a, the TXQSW 15 outputs the TXQ signal generated by the TXQ signal generating unit 12 from the terminal a to the D/A converter 17.

If the command output from the TX control unit 50 indicates that a signal is to be output from the terminal b, the TXQSW 15 outputs the TXQ signal generated by the TXQ signal generating unit 12 from the terminal b to the D/A converter 16.

The D/A converter 16 is a first digital-analog converting unit in which the input terminal is connected to the terminal a of the TXISW 14 and the terminal b of the TXQSW 15.

The D/A converter 16 performs D/A conversion on the TXI signal output from the terminal a of the TXISW 14 or the TXQ signal output from the terminal b of the TXQSW 15, and outputs the TXI signal which is an analog signal or the TXQ signal which is an analog signal to the signal path 21.

The D/A converter 17 is a second digital-analog converting unit in which the input terminal is connected to the terminal a of the TXQSW 15 and the terminal b of the TXISW 14.

The D/A converter 17 performs D/A conversion on the TXQ signal output from the terminal a of the TXQSW 15 or the TXI signal output from the terminal b of the TXISW 14, and outputs the TXQ signal which is an analog signal or the TXI signal which is an analog signal to the signal path 22.

The signal path 21 is a first path having a frequency characteristic of a passing loss of G1 and a frequency characteristic of a passing phase of θ1, and transmits the TXI signal which is an analog signal or the TXQ signal which is an analog signal output from the D/A converter 16. In FIG. 1, the signal path 21 is expressed as "F special 1".

The signal path 22 is a second path having a frequency characteristic of a passing loss is G2 and a frequency characteristic of a passing phase of θ2, and transmits the TXQ signal which is an analog signal or the TXI signal which is an analog signal output from the D/A converter 17. In FIG. 1, the signal path 22 is expressed as "F special 2".

A 90° phase difference generating unit 23 of the quadrature modulator 3 is a first phase difference generating unit for generating, from the local signal generated by the local signal generating unit 1, a first transmission local signal and a second transmission local signal each having the same frequency as the local signal and having a phase difference of 90° from each other.

That is, the 90° phase difference generating unit 23 outputs the first transmission local signal having the same frequency as the local signal generated by the local signal generating unit 1 from the terminal a.

In addition, the 90° phase difference generating unit 23 outputs the second transmission local signal having the same frequency as the local signal generated by the local signal generating unit 1 and having a phase ahead of the first transmission local signal by 90° or the second transmission local signal having the same frequency as the local signal generated by the local signal generating unit 1 and having a phase behind the first transmission local signal by 90° from the terminal b.

In FIG. 1, the 90° phase difference generating unit 23 is expressed as "±90".

A frequency converter 24 of the quadrature modulator 3 is a first frequency converter for converting the frequency of a TXI signal or a TXQ signal that has passed through the signal path 21 using the first transmission local signal output from the terminal a of the 90° phase difference generating unit 23, and outputting the frequency-converted TXI signal or the frequency-converted TXQ signal to a signal synthesis unit 26.

A frequency converter 25 of the quadrature modulator 3 is a second frequency converter for converting the frequency of a TXQ signal or a TXI signal that has passed through the signal path 22 using the second transmission local signal output from the terminal b of the 90° phase difference generating unit 23, and outputting the frequency-converted TXQ signal or the frequency-converted TXI signal to the signal synthesis unit 26.

The signal synthesis unit 26 of the quadrature modulator 3 synthesizes the frequency-converted TXI signal or the frequency-converted TXQ signal output from the frequency converter 24 with the frequency-converted TXQ signal or the frequency-converted TXI signal output from the frequency converter 25, and outputs a TXO signal which is a synthesized signal thereof.

A signal branching unit 31 of the quadrature demodulator 4 branches the TXO signal output from the signal synthesis unit 26 of the quadrature modulator 3 into two, outputs one TXO signal to a frequency converter 33, and outputs the other TXO signal to a frequency converter 34.

A 90° phase difference generating unit 32 of the quadrature demodulator 4 is a second phase difference generating unit for generating, from the local signal generated by the local signal generating unit 1, a first reception local signal and a second reception local signal each having the same frequency as the local signal and having a phase difference of 90° from each other.

That is, the 90° phase difference generating unit 32 outputs the first reception local signal having the same frequency as the local signal generated by the local signal generating unit 1 from the terminal a.

In addition, the 90° phase difference generating unit 32 outputs the second reception local signal having the same frequency as the local signal generated by the local signal generating unit 1 and having a phase ahead of the first reception local signal by 90° from the terminal b.

In FIG. 1, the 90° phase difference generating unit 32 is expressed as "+90°".

The frequency converter 33 of the quadrature demodulator 4 is a third frequency converter for converting the frequency of a TXO signal branched by the signal branching unit 31 using the first reception local signal output from the terminal a of the 90° phase difference generating unit 32, and outputting the RXI signal which is the frequency-converted TXO signal to the signal path 35.

The frequency converter 34 of the quadrature demodulator 4 is a fourth frequency converter for converting the frequency of a TXO signal branched by the signal branching unit 31 using the second reception local signal output from the terminal b of the 90° phase difference generating unit 32, and outputting the RXQ signal which is the frequency-converted TXO signal to the signal path 36.

The signal path 35 is a third path having a frequency characteristic of a passing loss of G3 and a frequency characteristic of a passing phase of θ3, and transmits the RXI signal output from the frequency converter 33. In FIG. 1, the signal path 35 is expressed as "F special 3".

The signal path 36 of the quadrature demodulator 4 is a fourth path having a frequency characteristic of a passing loss of G4 and a frequency characteristic of a passing phase of θ4, and transmits the RXQ signal output from the frequency converter 34. In FIG. 1, the signal path 36 is expressed as "F special 4".

An A/D converter 41 of the reception baseband unit 5 is a first analog-digital converting unit for performing A/D conversion on an RXI signal that has passed through the signal path 35, and outputting the RXI signal which is a digital signal to an RXI signal processing unit 43.

An A/D converter 42 of the reception baseband unit 5 is a second analog-digital converting unit for performing A/D conversion on an RXQ signal that has passed through the signal path 36, and outputting the RXQ signal which is a digital signal to an RXQ signal processing unit 44.

The RXI signal processing unit 43 of the reception baseband unit 5 is a first signal measuring unit for measuring the RXI signal which is a digital signal output from the A/D converter 41.

The RXQ signal processing unit 44 of the reception baseband unit 5 is a second signal measuring unit for measuring the RXQ signal which is a digital signal output from the A/D converter 42.

The TX control unit 50 of the transmission baseband unit 2 is a control unit for controlling the TXISW 14 and TXQSW 15 of the first signal exchanger 13, the TXI signal generating unit 11, and the TXQ signal generating unit 12.

The TX control unit 50 controls generation of a TXI signal in the TXI signal generating unit 11 and generation of a TXQ signal in the TXQ signal generating unit 12 on the basis of a measurement result of the RXI signal processing unit 43 before and after signal exchange by the first signal exchanger 13.

That is, the TX control unit 50 acquires the RXI signal measured by the RXI signal processing unit 43 before the TXI signal and the TXQ signal are exchanged by the first signal exchanger 13, and the RXI signal measured by the RXI signal processing unit 43 after the TXI signal and the TXQ signal are exchanged by the first signal exchanger 13.

The TX control unit 50 controls an equalizer process of the TXI signal generating unit 11 and an equalizer process of the TXQ signal generating unit 12 so that the amplitude and phase of a TXI signal or a TXQ signal frequency-converted by the frequency converter 24 match with the amplitude and phase of a TXQ signal or a TXI signal frequency-converted by the frequency converter 25, on the basis of the acquired two RXI signals.

In addition, the TX control unit 50 controls generation of a TXI signal in the TXI signal generating unit 11 and generation of a TXQ signal in the TXQ signal generating unit 12 on the basis of a measurement result of the RXQ signal processing unit 44 before and after signal exchange by the first signal exchanger 13.

That is, the TX control unit 50 acquires the RXQ signal measured by the RXQ signal processing unit 44 before the TXI signal and the TXQ signal are exchanged by the first signal exchanger 13, and the RXQ signal measured by the RXQ signal processing unit 44 after the TXI signal and the TXQ signal are exchanged by the first signal exchanger 13.

The TX control unit 50 controls an equalizer process of the TXI signal generating unit 11 and an equalizer process of the TXQ signal generating unit 12 so that the amplitude and phase of the TXI signal or the TXQ signal frequency-converted by the frequency converter 24 match with the amplitude and phase of the TXQ signal or the TXI signal frequency-converted by the frequency converter 25, on the basis of the acquired two RXQ signals.

The equalizer process of the TXI signal generating unit 11 is a process of controlling the amplitude and phase of the generated TXI signal, and the equalizer process of the TXQ signal generating unit 12 is a process of controlling the amplitude and phase of the generated TXQ signal.

Next, the operation will be described.

In the first embodiment, the transceiver is operated in mode (1) or mode (2), and an RXI signal and an RXQ signal are measured.

First, processing for measuring an RXI signal and an RXQ signal by operating the transceiver in mode (1) will be described.

In mode (1), a TXI signal is output from the terminal a of the TXISW 14 to the D/A converter 16, and a TXQ signal is output from the terminal a of the TXQSW 15 to the D/A converter 17.

In mode (1), the second transmission local signal output from the terminal b of the 90° phase difference generating unit 23 has a phase ahead of the first transmission local signal output from the terminal a of the 90° phase difference generating unit 23 by 90°.

The TXI signal generating unit 11 of the transmission baseband unit 2 generates a TXI signal of a transmission wave and outputs the TXI signal to the TXISW 14 of the first signal exchanger 13.

The TXQ signal generating unit 12 of the transmission baseband unit 2 generates a TXQ signal of a transmission wave and outputs the TXQ signal to the TXQSW 15 of the first signal exchanger 13.

Since the TX control unit 50 of the transmission baseband unit 2 is in mode (1), the TX control unit 50 outputs a command indicating that a signal is to be output from the terminal a to the TXISW 14 and the TXQSW 15 as a switching command of signals output from the TXISW 14 and the TXQSW 15.

The TXISW 14 of the first signal exchanger 13 outputs the TXI signal generated by the TXI signal generating unit 11 from the terminal a to the D/A converter 16 on the basis of the switching command output from the TX control unit 50.

The TXQSW 15 of the first signal exchanger 13 outputs the TXQ signal generated by the TXQ signal generating unit 12 from the terminal a to the D/A converter 17 on the basis of the switching command output from the TX control unit 50.

The D/A converter 16 of the transmission baseband unit 2 performs D/A conversion on the TXI signal output from the terminal a of the TXISW 14 and outputs the TXI signal which is an analog signal to the signal path 21.

The D/A converter 17 of the transmission baseband unit 2 performs D/A conversion on the TXQ signal output from the terminal a of the TXQSW 15 and outputs the TXQ signal which is an analog signal to the signal path 22.

The TXI signal output from the D/A converter 16 of the transmission baseband unit 2 passes through the signal path 21.

As a result, a frequency characteristic of the signal path 21, that is, a frequency characteristic of a passing loss of G1 and a frequency characteristic of a passing phase of θ1 are added to the TXI signal.

The TXQ signal output from the D/A converter 17 of the transmission baseband unit 2 passes through the signal path 22.

As a result, a frequency characteristic of the signal path 22, that is, a frequency characteristic of a passing loss of G2 and a frequency characteristic of a passing phase of θ2 are added to the TXQ signal.

The 90° phase difference generating unit 23 of the quadrature modulator 3 outputs the first transmission local signal having the same frequency as the local signal generated by the local signal generating unit 1 from the terminal a to the frequency converter 24.

In addition, since the 90° phase difference generating unit 23 is in mode (1), the 90° phase difference generating unit 23 outputs the second transmission local signal having a phase ahead of the first transmission local signal by 90° from the terminal b to the frequency converter 25.

The frequency converter 24 of the quadrature modulator 3 converts the frequency of the TXI signal which is an analog signal that has passed through the signal path 21 using the first transmission local signal output from the terminal a of the 90° phase difference generating unit 23, and outputs the frequency-converted TXI signal to the signal synthesis unit 26.

The frequency converter 25 of the quadrature modulator 3 converts the frequency of the TXQ signal which is an analog signal that has passed through the signal path 22 using the second transmission local signal output from the terminal b of the 90° phase difference generating unit 23, and outputs the frequency-converted TXQ signal to the signal synthesis unit 26.

The signal synthesis unit 26 of the quadrature modulator 3 synthesizes the frequency-converted TXI signal output from the frequency converter 24 with the frequency-converted TXQ signal output from the frequency converter 25, and outputs the TXO signal which is a synthesized signal thereof.

Upon receiving the TXO signal from the signal synthesis unit 26 of the quadrature modulator 3, the signal branching unit 31 of the quadrature demodulator 4 branches the TXO signal into two, outputs one TXO signal to the frequency converter 33, and outputs the other TXO signal to the frequency converter 34.

The 90° phase difference generating unit 32 of the quadrature demodulator 4 outputs the first reception local signal having the same frequency as the local signal generated by the local signal generating unit 1 from the terminal a to the frequency converter 33.

In addition, the 90° phase difference generating unit 32 outputs the second reception local signal having the same frequency as the local signal generated by the local signal generating unit 1 and having a phase ahead of the first reception local signal by 90° from the terminal b to the frequency converter 34.

The frequency converter 33 of the quadrature demodulator 4 converts the frequency of one TXO signal branched by the signal branching unit 31 using the first reception local signal output from the terminal a of the 90° phase difference generating unit 32, and outputs the RXI signal which is the frequency-converted TXO signal to the signal path 35.

The frequency converter 34 of the quadrature demodulator 4 converts the frequency of the other TXO signal branched by the signal branching unit 31 using the second reception local signal output from the terminal b of the 90° phase difference generating unit 32, and outputs the RXQ signal which is the frequency-converted TXO signal to the signal path 36.

The RXI signal output from the frequency converter 33 of the quadrature demodulator 4 passes through the signal path 35.

As a result, a frequency characteristic of the signal path 35, that is, a frequency characteristic of a passing loss of G3 and a frequency characteristic of a passing phase of θ3 are added to the RXI signal.

The RXQ signal output from the frequency converter 34 of the quadrature demodulator 4 passes through the signal path 36.

As a result, a frequency characteristic of the signal path 36, that is, a frequency characteristic of a passing loss of G4 and a frequency characteristic of a passing phase of θ4 are added to the RXQ signal.

The A/D converter 41 of the reception baseband unit 5 performs A/D conversion on the RXI signal that has passed through the signal path 35, and outputs the RXI signal which is a digital signal to the RXI signal processing unit 43.

The A/D converter 42 of the reception baseband unit 5 performs A/D conversion on the RXQ signal that has passed through the signal path 36, and outputs the RXQ signal which is a digital signal to the RXQ signal processing unit 44.

Upon receiving the RXI signal which is a digital signal from the A/D converter 41, the RXI signal processing unit 43 of the reception baseband unit 5 measures the RXI signal.

Upon receiving the RXQ signal which is a digital signal from the A/D converter 42, the RXQ signal processing unit 44 of the reception baseband unit 5 measures the RXQ signal.

Here, the RXI signal measured by the RXI signal processing unit 43 is expressed by the following formula (1).

$$RXI = 0.5\ A(G1 \times G3)\cos(\theta + (\theta 1 + \theta 3)) \quad (1)$$

In addition, the RXQ signal measured by the RXQ signal processing unit 44 is expressed by the following formula (2).

$$RXQ = 0.5\ A(G2 \times G4)\sin(\theta + (\theta 2 + \theta 4)) \quad (2)$$

In formulas (1) and (2), A is a constant.

Next, processing for measuring the RXI signal and the RXQ signal by operating the transceiver in mode (2) will be described.

In mode (2), the TXI signal is output from the terminal b of the TXISW 14 to the D/A converter 17, and the TXQ signal is output from the terminal b of the TXQSW 15 to the D/A converter 16.

In mode (2), the second transmission local signal output from the terminal b of the 90° phase difference generating unit 23 has a phase behind the first transmission local signal output from the terminal a of the 90° phase difference generating unit 23 by 90°.

The TXI signal generating unit 11 of the transmission baseband unit 2 generates a TXI signal of a transmission wave and outputs the TXI signal to the TXISW 14 of the first signal exchanger 13.

The TXQ signal generating unit 12 of the transmission baseband unit 2 generates a TXQ signal of a transmission wave and outputs the TXQ signal to the TXQSW 15 of the first signal exchanger 13.

Since the TX control unit 50 of the transmission baseband unit 2 is in mode (2), the TX control unit 50 outputs a command indicating that a signal is to be output from the terminal b to the TXISW 14 and the TXQSW 15 as a switching command of signals output from the TXISW 14 and the TXQSW 15.

The TXISW 14 of the first signal exchanger 13 outputs the TXI signal generated by the TXI signal generating unit 11 from the terminal b to the D/A converter 17 on the basis of the switching command output from the TX control unit 50.

The TXQSW 15 of the first signal exchanger 13 outputs the TXQ signal generated by the TXQ signal generating unit 12 from the terminal b to the D/A converter 16 on the basis of the switching command output from the TX control unit 50.

The D/A converter 16 of the transmission baseband unit 2 performs D/A conversion on the TXQ signal output from the terminal b of the TXQSW 15 and outputs the TXQ signal which is an analog signal to the signal path 21.

The D/A converter 17 of the transmission baseband unit 2 performs D/A conversion on the TXI signal output from the terminal b of the TXISW 14 and outputs the TXI signal which is an analog signal to the signal path 22.

The TXQ signal output from the D/A converter 16 of the transmission baseband unit 2 passes through the signal path 21.

As a result, a frequency characteristic of the signal path 21, that is, a frequency characteristic of a passing loss of G1 and a frequency characteristic of a passing phase of θ1 are added to the TXQ signal.

The TXI signal output from the D/A converter 17 of the transmission baseband unit 2 passes through the signal path 22.

As a result, a frequency characteristic of the signal path 22, that is, a frequency characteristic of a passing loss of G2 and a frequency characteristic of a passing phase of θ2 are added to the TXI signal.

The 90° phase difference generating unit 23 of the quadrature modulator 3 outputs the first transmission local signal having the same frequency as the local signal generated by the local signal generating unit 1 from the terminal a to the frequency converter 24.

In addition, since the 90° phase difference generating unit 23 is in mode (2), the 90° phase difference generating unit 23 outputs the second transmission local signal having a phase behind the first transmission local signal by 90° from the terminal b to the frequency converter 25.

The frequency converter 24 of the quadrature modulator 3 converts the frequency of the TXQ signal which is an analog signal that has passed through the signal path 21 using the first transmission local signal output from the terminal a of the 90° phase difference generating unit 23, and outputs the frequency-converted TXQ signal to the signal synthesis unit 26.

The frequency converter 25 of the quadrature modulator 3 converts the frequency of the TXI signal which is an analog signal that has passed through the signal path 22 using the second transmission local signal output from the terminal b of the 90° phase difference generating unit 23, and outputs the frequency-converted TXI signal to the signal synthesis unit 26.

The signal synthesis unit 26 of the quadrature modulator 3 synthesizes the frequency-converted TXQ signal output from the frequency converter 24 with the frequency-converted TXI signal output from the frequency converter 25, and outputs the TXO signal which is a synthesized signal thereof.

Upon receiving the TXO signal from the signal synthesis unit 26 of the quadrature modulator 3, the signal branching unit 31 of the quadrature demodulator 4 branches the TXO signal into two, outputs one TXO signal to the frequency converter 33, and outputs the other TXO signal to the frequency converter 34.

The 90° phase difference generating unit 32 of the quadrature demodulator 4 outputs the first reception local signal having the same frequency as the local signal generated by the local signal generating unit 1 from the terminal a to the frequency converter 33.

In addition, the 90° phase difference generating unit 32 outputs the second reception local signal having the same frequency as the local signal generated by the local signal generating unit 1 and having a phase ahead of the first reception local signal by 90° from the terminal b to the frequency converter 34.

The frequency converter 33 of the quadrature demodulator 4 converts the frequency of one TXO signal branched by the signal branching unit 31 using the first reception local signal output from the terminal a of the 90° phase difference generating unit 32, and outputs the RXI signal which is the frequency-converted TXO signal to the signal path 35.

The frequency converter 34 of the quadrature demodulator 4 converts the frequency of the other TXO signal branched by the signal branching unit 31 using the second reception local signal output from the terminal b of the 90° phase difference generating unit 32, and outputs the RXQ signal which is the frequency-converted TXO signal to the signal path 36.

The RXI signal output from the frequency converter 33 of the quadrature demodulator 4 passes through the signal path 35.

As a result, a frequency characteristic of the signal path 35, that is, a frequency characteristic of a passing loss of G3 and a frequency characteristic of a passing phase of θ3 are added to the RXI signal.

The RXQ signal output from the frequency converter 34 of the quadrature demodulator 4 passes through the signal path 36.

As a result, a frequency characteristic of the signal path 36, that is, a frequency characteristic of a passing loss of G4 and a frequency characteristic of a passing phase of θ4 are added to the RXQ signal.

The A/D converter 41 of the reception baseband unit 5 performs A/D conversion on the RXI signal that has passed through the signal path 35, and outputs the RXI signal which is a digital signal to the RXI signal processing unit 43.

The A/D converter 42 of the reception baseband unit 5 performs A/D conversion on the RXQ signal that has passed through the signal path 36, and outputs the RXQ signal which is a digital signal to the RXQ signal processing unit 44.

Upon receiving the RXI signal which is a digital signal from the A/D converter 41, the RXI signal processing unit 43 of the reception baseband unit 5 measures the RXI signal.

Upon receiving the RXQ signal which is a digital signal from the A/D converter 42, the RXQ signal processing unit 44 of the reception baseband unit 5 measures the RXQ signal.

Here, the RXI signal measured by the RXI signal processing unit 43 is expressed by the following formula (3).

$$RXI = 0.5\ A(G2 \times G3)\cos(\theta + (\theta 2 + \theta 3)) \quad (3)$$

In addition, the RXQ signal measured by the RXQ signal processing unit 44 is expressed by the following formula (4).

$$RXQ = 0.5\ A(G1 \times G4)\sin(\theta + (\theta 1 + \theta 4)) \quad (4)$$

The TX control unit 50 derives an amplitude ratio (G1/G2) which is a ratio between the passing loss G1 of the signal path 21 and the passing loss G2 of the signal path 22 from the RXI signal measured by the RXI signal processing unit 43 in mode (1) and indicated by formula (1) and the RXI signal measured by the RXI signal processing unit 43 in mode (2) and indicated by formula (3).

As illustrated in the following formula (5), the amplitude ratio (G1/G2) can be derived by dividing 0.5 A (G1×G3) which is the amplitude of the RXI signal indicated by formula (1) by 0.5 A (G2×G3) which is the amplitude of the RXI signal indicated by formula (3).

$$G1/G2 = (0.5\ A(G1 \times G3))/(0.5\ A(G2 \times G3)) \quad (5)$$

The TX control unit 50 derives a phase difference (θ1−θ2) which is a difference between the passing phase θ1 of the signal path 21 and the passing phase θ2 of the signal path 22 from the RXI signal measured by the RXI signal processing unit 43 in mode (1) and indicated by formula (1) and the RXI signal measured by the RXI signal processing unit 43 in mode (2) and indicated by formula (3).

As illustrated in the following formula (6), the phase difference (θ1−θ2) can be derived by subtracting θ+(θ2+θ3) which is the phase of the RXI signal indicated by formula (3) from θ+(θ1+θ3) which is the phase of the RXI signal indicated by formula (1).

$$\theta 1 - \theta 2 = (\theta + (\theta 1 + \theta 3)) - (\theta + (\theta 2 + \theta 3)) \quad (6)$$

Upon deriving the amplitude ratio (G1/G2) and the phase difference (θ1−θ2), the TX control unit 50 controls the equalizer process of the TXI signal generating unit 11 and the equalizer process of the TXQ signal generating unit 12 so that the amplitude ratio (G1/G2) is 1 and the phase difference (θ1−θ2) is zero.

That is, the TX control unit 50 controls the amplitude and phase of the TXI signal generated by the TXI signal generating unit 11 and the amplitude and phase of the TXQ signal generated by the TXQ signal generating unit 12 so that the amplitude ratio (G1/G2) is 1 and the phase difference (θ1−θ2) is zero.

As a result, even when the local signal generating unit 1 which is an analog circuit is commonly used by the quadrature modulator 3 and the quadrature demodulator 4, a difference between the frequency characteristic of the signal path 21 and the frequency characteristic of the signal path 22 can be compensated.

By compensating the difference between the frequency characteristic of the signal path 21 and the frequency characteristic of the signal path 22, it is possible to suppress generation of an image component in the TXO signal.

Here, an example is illustrated in which the TX control unit 50 derives a difference in frequency characteristic between the signal paths 21 and 22 from the RXI signal measured by the RXI signal processing unit 43 in mode (1) and indicated by formula (1) and the RXI signal measured by the RXI signal processing unit 43 in mode (2) and indicated by formula (3). However, the difference in frequency characteristic may be derived as described below.

That is, the TX control unit 50 may derive the difference in frequency characteristic between the signal paths 21 and 22 from the RXQ signal measured by the RXQ signal processing unit 44 in mode (1) and indicated by formula (2) and the RXQ signal measured by the RXQ signal processing unit 44 in mode (2) and indicated by formula (4).

As illustrated in the following formula (7), the amplitude ratio (G1/G2) can be derived by dividing 0.5 A (G1×G4) which is the amplitude of the RXQ signal indicated by formula (4) by 0.5 A (G2×G4) which is the amplitude of the RXQ signal indicated by formula (2).

$$G1/G2 = (0.5\ A(G1 \times G4))/(0.5\ A(G2 \times G4)) \quad (7)$$

As illustrated in the following formula (8), the phase difference (θ1−θ2) can be derived by subtracting θ+(θ2+θ4) which is the phase of the RXQ signal indicated by formula (2) from θ+(θ1+θ4) which is the phase of the RXQ signal indicated by formula (4).

$$\theta 1 - \theta 2 = (\theta + (\theta 1 + \theta 4)) - (\theta + (\theta 2 + \theta 4)) \quad (8)$$

As is apparent from the above, according to the first embodiment, it is configured to include the first signal exchanger 13 for exchanging the TXI signal and the TXQ signal output from the transmission baseband unit 2 to the signal path 21 and the signal path 22, and to include the TX control unit 50 for controlling generation of the TXI signal and the TXQ signal in the transmission baseband unit 2 on the basis of a measurement result of the reception baseband unit 5 before and after signal exchange by the first signal exchanger 13.

As a result, the transceiver only needs to have one local signal generating unit 1 mounted thereon as a local signal generating unit which is an analog circuit. Therefore, the circuit scale of the analog circuit can be reduced. In addition, since the transmission local signal and the reception local signal do not interfere with each other unlike in a case where the transmission local signal generating unit and the reception local signal generating unit are separately mounted, it is possible to prevent deterioration of a communication characteristic due to interference between the transmission local signal and the reception local signal.

Second Embodiment

In the first embodiment, the example has been illustrated in which the transmission baseband unit 2 includes the first signal exchanger 13, but in this second embodiment, an example will be described in which a transmission baseband unit 2 includes a first signal exchanger 13, and a reception baseband unit 5 includes a second signal exchanger 45.

Figure 2:
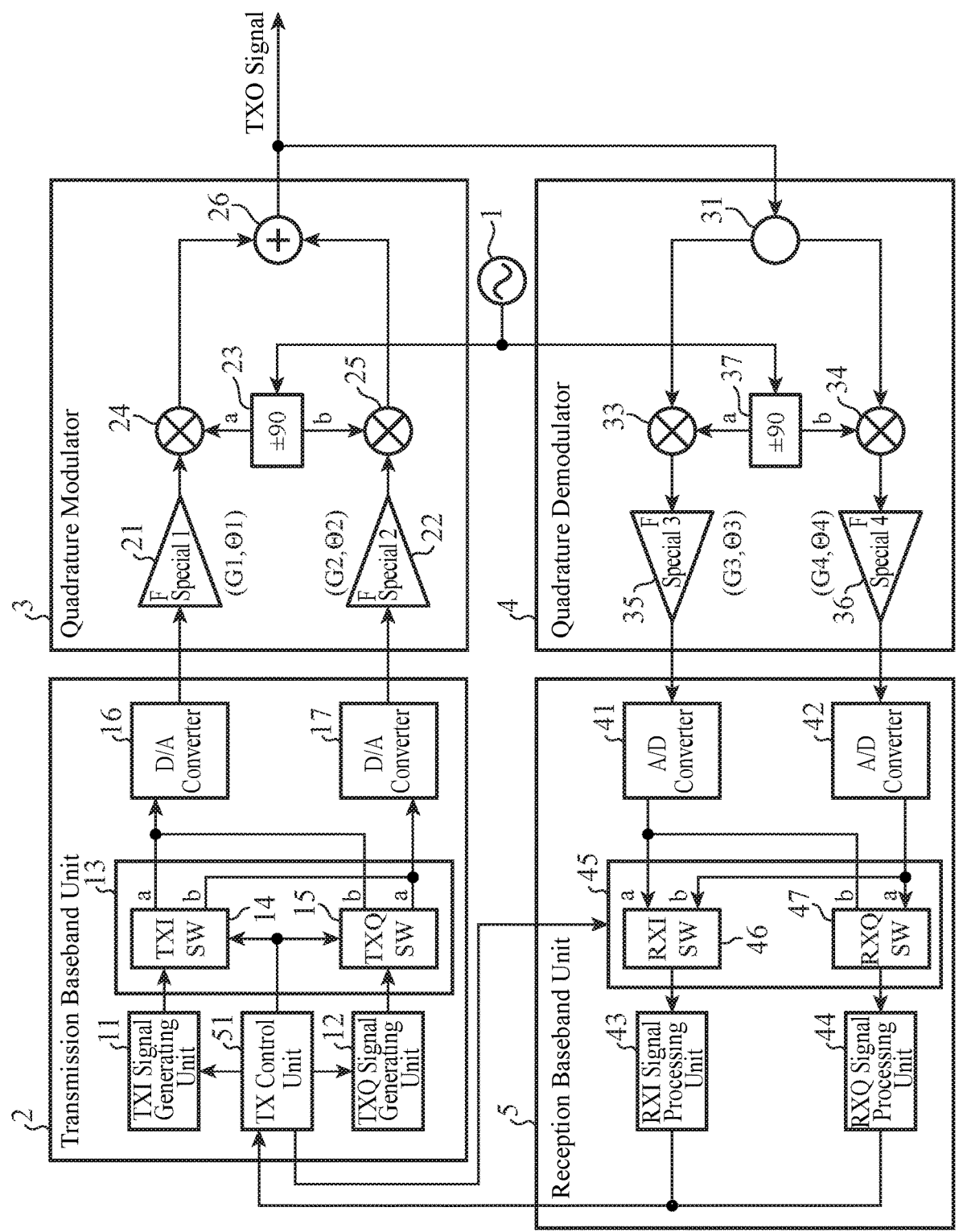
FIG. 2 is a configuration diagram illustrating a transceiver according to a second embodiment of the present invention.

FIG. 2 is a configuration diagram illustrating a transceiver according to the second embodiment of the present invention. In FIG. 2, the same reference numerals as those in FIG. 1 denote the same or corresponding parts, and therefore description thereof will be omitted.

A 90° phase difference generating unit 37 of a quadrature demodulator 4 is a second phase difference generating unit for generating, from a local signal generated by a local signal generating unit 1, a first reception local signal and a second reception local signal each having the same frequency as the local signal and having a phase difference of 90° from each other.

That is, the 90° phase difference generating unit 37 outputs the first reception local signal having the same frequency as the local signal generated by the local signal generating unit 1 from a terminal a.

In addition, the 90° phase difference generating unit 37 outputs the second reception local signal having the same frequency as the local signal generated by the local signal generating unit 1 and having a phase ahead of the first reception local signal by 90° or the second reception local signal having the same frequency as the local signal generated by the local signal generating unit 1 and having a phase behind the first reception local signal by 90° from a terminal b.

In FIG. 2, the 90° phase difference generating unit 37 is expressed as "±90°".

The second signal exchanger 45 includes an RXISW 46 and an RXQSW 47.

The second signal exchanger 45 exchanges digital signals output from a signal path 35 and a signal path 36 to the reception baseband unit 5.

The RXISW 46 is a third path switching unit in which a terminal a is connected to an output terminal of an A/D converter 41 and a terminal b is connected to an output terminal of an A/D converter 42.

If a command output from a TX control unit 51 indicates that a signal is to be input from the terminal a, the RXISW 46 outputs a digital signal output from the A/D converter 41 to an RXI signal processing unit 43.

If the command output from the TX control unit 51 indicates that a signal is to be input from the terminal b, the RXISW 46 outputs a digital signal output from the A/D converter 42 to the RXI signal processing unit 43.

The RXQSW 47 is a fourth path switching unit in which a terminal a is connected to the output terminal of the A/D converter 42 and a terminal b is connected to the output terminal of the A/D converter 41.

If a command output from the TX control unit 51 indicates that a signal is to be input from the terminal a, the RXQSW 47 outputs a digital signal output from the A/D converter 42 to an RXQ signal processing unit 44.

If the command output from the TX control unit 51 indicates that a signal is to be input from the terminal b, the RXQSW 47 outputs a digital signal output from the A/D converter 41 to the RXQ signal processing unit 44.

The TX control unit 51 of the transmission baseband unit 2 is a control unit for controlling TXISW 14 and TXQSW 15 of the first signal exchanger 13, the RXISW 46 and RXQSW 47 of the second signal exchanger 45, a TXI signal generating unit 11, and a TXQ signal generating unit 12.

Similar to the TX control unit 50 of FIG. 1, the TX control unit 51 controls generation of a TXI signal in the TXI signal generating unit 11 and generation of a TXQ signal in the TXQ signal generating unit 12 on the basis of a measurement result of the RXI signal processing unit 43 before and after signal exchange by the first signal exchanger 13.

In addition, similar to the TX control unit 50 of FIG. 1, the TX control unit 51 controls generation of the TXI signal in the TXI signal generating unit 11 and generation of the TXQ signal in the TXQ signal generating unit 12 on the basis of a measurement result of the RXQ signal processing unit 44 before and after signal exchange by the first signal exchanger 13.

The TX control unit 51 controls generation of the TXI signal in the TXI signal generating unit 11 and generation of the TXQ signal in the TXQ signal generating unit 12 on the basis of a measurement result of the RXI signal processing unit 43 before and after signal exchange by the second signal exchanger 45.

In addition, the TX control unit 51 controls generation of the TXI signal in the TXI signal generating unit 11 and generation of the TXQ signal in the TXQ signal generating unit 12 on the basis of a measurement result of the RXQ signal processing unit 44 before and after signal exchange by the second signal exchanger 45.

Next, the operation will be described.

In the second embodiment, the transceiver is operated in mode (11), mode (21), mode (12), or mode (22), and the RXI signal and the RXQ signal are measured.

First, processing for measuring the RXI signal and the RXQ signal by operating the transceiver in mode (11) will be described.

In mode (11), the TXI signal is output from a terminal a of the TXISW 14 to a D/A converter 16, and the TXQ signal is output from a terminal a of the TXQSW 15 to a D/A converter 17.

In addition, in mode (11), the RXISW 46 outputs a signal input to the terminal a, and the RXQSW 47 outputs a signal input to the terminal a.

In mode (11), a second transmission local signal output from a terminal b of a 90° phase difference generating unit 23 has a phase ahead of a first transmission local signal output from a terminal a of the 90° phase difference generating unit 23 by 90°.

In addition, in mode (11), the second reception local signal output from the terminal b of the 90° phase difference generating unit 37 has a phase ahead of the first reception local signal output from the terminal a of the 90° phase difference generating unit 37 by 90°.

The TXI signal generating unit 11 of the transmission baseband unit 2 generates a TXI signal of a transmission wave and outputs the TXI signal to the TXISW 14 of the first signal exchanger 13.

The TXQ signal generating unit 12 of the transmission baseband unit 2 generates a TXQ signal of a transmission wave and outputs the TXQ signal to the TXQSW 15 of the first signal exchanger 13.

Since the TX control unit 51 of the transmission baseband unit 2 is in mode (11), the TX control unit 51 outputs a command indicating that a signal is to be output from the terminal a to the TXISW 14 and the TXQSW 15 as a switching command of signals output from the TXISW 14 and the TXQSW 15.

The TXISW 14 of the first signal exchanger 13 outputs the TXI signal generated by the TXI signal generating unit 11 from the terminal a to the D/A converter 16 on the basis of the switching command output from the TX control unit 51.

The TXQSW 15 of the first signal exchanger 13 outputs the TXQ signal generated by the TXQ signal generating unit 12 from the terminal a to the D/A converter 17 on the basis of the switching command output from the TX control unit 51.

The D/A converter 16 of the transmission baseband unit 2 performs D/A conversion on the TXI signal output from the terminal a of the TXISW 14 and outputs the TXI signal which is an analog signal to a signal path 21.

The D/A converter 17 of the transmission baseband unit 2 performs D/A conversion on the TXQ signal output from the terminal a of the TXQSW 15 and outputs the TXQ signal which is an analog signal to a signal path 22.

The TXI signal output from the D/A converter 16 of the transmission baseband unit 2 passes through the signal path 21.

As a result, a frequency characteristic of the signal path 21, that is, a frequency characteristic of a passing loss of G1 and a frequency characteristic of a passing phase of θ1 are added to the TXI signal.

The TXQ signal output from the D/A converter 17 of the transmission baseband unit 2 passes through the signal path 22.

As a result, a frequency characteristic of the signal path 22, that is, a frequency characteristic of a passing loss of G2 and a frequency characteristic of a passing phase of θ2 are added to the TXQ signal.

The 90° phase difference generating unit 23 of a quadrature modulator 3 outputs the first transmission local signal having the same frequency as the local signal generated by the local signal generating unit 1 from the terminal a to a frequency converter 24.

In addition, since the 90° phase difference generating unit 23 is in mode (11), the 90° phase difference generating unit 23 outputs the second transmission local signal having a phase ahead of the first transmission local signal by 90° from the terminal b to a frequency converter 25.

The frequency converter 24 of the quadrature modulator 3 converts the frequency of the TXI signal which is an analog signal that has passed through the signal path 21 using the first transmission local signal output from the terminal a of the 90° phase difference generating unit 23, and outputs the frequency-converted TXI signal to a signal synthesis unit 26.

The frequency converter 25 of the quadrature modulator 3 converts the frequency of the TXQ signal which is an analog signal that has passed through the signal path 22 using the second transmission local signal output from the terminal b of the 90° phase difference generating unit 23, and outputs the frequency-converted TXQ signal to the signal synthesis unit 26.

The signal synthesis unit 26 of the quadrature modulator 3 synthesizes the frequency-converted TXI signal output from the frequency converter 24 with the frequency-converted TXQ signal output from the frequency converter 25, and outputs the TXO signal which is a synthesized signal thereof.

Upon receiving the TXO signal from the signal synthesis unit 26 of the quadrature modulator 3, a signal branching unit 31 of the quadrature demodulator 4 branches the TXO signal into two, outputs one TXO signal to a frequency converter 33, and outputs the other TXO signal to a frequency converter 34.

The 90° phase difference generating unit 37 of the quadrature demodulator 4 outputs the first reception local signal having the same frequency as the local signal generated by the local signal generating unit 1 from the terminal a to the frequency converter 33.

In addition, since the 90° phase difference generating unit 37 is in mode (11), the 90° phase difference generating unit 37 outputs the second reception local signal having a phase ahead of the first reception local signal by 90° from the terminal b to the frequency converter 34.

The frequency converter 33 of the quadrature demodulator 4 converts the frequency of one TXO signal branched by the signal branching unit 31 using the first reception local signal output from the terminal a of the 90° phase difference generating unit 37, and outputs the RXI signal which is the frequency-converted TXO signal to the signal path 35.

The frequency converter 34 of the quadrature demodulator 4 converts the frequency of the other TXO signal branched by the signal branching unit 31 using the second reception local signal output from the terminal b of the 90° phase difference generating unit 37, and outputs the RXQ signal which is the frequency-converted TXO signal to the signal path 36.

The RXI signal output from the frequency converter 33 of the quadrature demodulator 4 passes through the signal path 35.

As a result, a frequency characteristic of the signal path 35, that is, a frequency characteristic of a passing loss of G3 and a frequency characteristic of a passing phase of θ3 are added to the RXI signal.

The RXQ signal output from the frequency converter 34 of the quadrature demodulator 4 passes through the signal path 36.

As a result, a frequency characteristic of the signal path 36, that is, a frequency characteristic of a passing loss of G4 and a frequency characteristic of a passing phase of θ4 are added to the RXQ signal.

The A/D converter 41 of the reception baseband unit 5 performs A/D conversion on the RXI signal that has passed through the signal path 35, and outputs the RXI signal which is a digital signal.

The A/D converter 42 of the reception baseband unit 5 performs A/D conversion on the RXQ signal that has passed through the signal path 36, and outputs the RXQ signal which is a digital signal.

Since the TX control unit 51 of the transmission baseband unit 2 is in mode (11), the TX control unit 51 outputs a command indicating that a signal input is to be output from the terminal a to the RXISW 46 and the RXQSW 47 as a switching command of signals input to the RXISW 46 and the RXQSW 47.

The RXISW 46 of the second signal exchanger 45 outputs the RXI signal which is an output signal of the A/D converter 41, input to the terminal a, to the RXI signal processing unit 43 on the basis of the switching command output from the TX control unit 51.

The RXQSW 47 of the second signal exchanger 45 outputs the RXQ signal which is an output signal of the A/D converter 42, input to the terminal a, to the RXQ signal processing unit 44 on the basis of the switching command output from the TX control unit 51.

Upon receiving the RXI signal from the RXISW 46, the RXI signal processing unit 43 of the reception baseband unit 5 measures the RXI signal.

Upon receiving the RXQ signal from the RXQSW 47, the RXQ signal processing unit 44 of the reception baseband unit 5 measures the RXQ signal.

Here, the RXI signal measured by the RXI signal processing unit 43 is expressed by the following formula (9).

$$RXI = 0.5\,A(G1 \times G3)\cos(\theta + (\theta1 + \theta3)) \qquad (9)$$

In addition, the RXQ signal measured by the RXQ signal processing unit 44 is expressed by the following formula (10).

$$RXQ = 0.5\,A(G2 \times G4)\sin(\theta + (\theta2 + \theta4)) \qquad (10)$$

Next, processing for measuring the RXI signal and the RXQ signal by operating the transceiver in mode (21) will be described.

In mode (21), the TXI signal is output from the terminal b of the TXISW 14 to the D/A converter 17, and the TXQ signal is output from the terminal b of the TXQSW 15 to the D/A converter 16.

In addition, in mode (21), the RXISW 46 outputs a signal input from the terminal a, and the RXQSW 47 outputs a signal input from the terminal a.

In mode (21), the second transmission local signal output from the terminal b of the 90° phase difference generating unit 23 has a phase behind the first transmission local signal output from the terminal a of the 90° phase difference generating unit 23 by 90°.

In addition, in mode (21), the second reception local signal output from the terminal b of the 90° phase difference generating unit 37 has a phase ahead of the first reception local signal output from the terminal a of the 90° phase difference generating unit 37 by 90°.

The TXI signal generating unit 11 of the transmission baseband unit 2 generates a TXI signal of a transmission wave and outputs the TXI signal to the TXISW 14 of the first signal exchanger 13.

The TXQ signal generating unit 12 of the transmission baseband unit 2 generates a TXQ signal of a transmission wave and outputs the TXQ signal to the TXQSW 15 of the first signal exchanger 13.

Since the TX control unit 51 of the transmission baseband unit 2 is in mode (21), the TX control unit 51 outputs a command indicating that a signal is to be output from the terminal b to the TXISW 14 and the TXQSW 15 as a switching command of signals output from the TXISW 14 and the TXQSW 15.

The TXISW 14 of the first signal exchanger 13 outputs the TXI signal generated by the TXI signal generating unit 11 from the terminal b to the D/A converter 17 on the basis of the switching command output from the TX control unit 51.

The TXQSW 15 of the first signal exchanger 13 outputs the TXQ signal generated by the TXQ signal generating unit 12 from the terminal b to the D/A converter 16 on the basis of the switching command output from the TX control unit 51.

The D/A converter 16 of the transmission baseband unit 2 performs D/A conversion on the TXQ signal output from the terminal b of the TXQSW 15 and outputs the TXQ signal which is an analog signal to the signal path 21.

The D/A converter 17 of the transmission baseband unit 2 performs D/A conversion on the TXI signal output from the terminal b of the TXISW 14 and outputs the TXI signal which is an analog signal to the signal path 22.

The TXQ signal output from the D/A converter 16 of the transmission baseband unit 2 passes through the signal path 21.

As a result, a frequency characteristic of the signal path 21, that is, a frequency characteristic of a passing loss of G1 and a frequency characteristic of a passing phase of θ1 are added to the TXQ signal.

The TXI signal output from the D/A converter 17 of the transmission baseband unit 2 passes through the signal path 22.

As a result, a frequency characteristic of the signal path 22, that is, a frequency characteristic of a passing loss of G2 and a frequency characteristic of a passing phase of θ2 are added to the TXI signal.

The 90° phase difference generating unit 23 of the quadrature modulator 3 outputs the first transmission local signal having the same frequency as the local signal generated by the local signal generating unit 1 from the terminal a to the frequency converter 24.

In addition, since the 90° phase difference generating unit 23 is in mode (21), the 90° phase difference generating unit 23 outputs the second transmission local signal having a phase behind the first transmission local signal by 90° from the terminal b to the frequency converter 25.

The frequency converter 24 of the quadrature modulator 3 converts the frequency of the TXQ signal which is an analog signal that has passed through the signal path 21 using the first transmission local signal output from the terminal a of the 90° phase difference generating unit 23, and outputs the frequency-converted TXQ signal to the signal synthesis unit 26.

The frequency converter 25 of the quadrature modulator 3 converts the frequency of the TXI signal which is an analog signal that has passed through the signal path 22 using the second transmission local signal output from the terminal b of the 90° phase difference generating unit 23, and outputs the frequency-converted TXI signal to the signal synthesis unit 26.

The signal synthesis unit 26 of the quadrature modulator 3 synthesizes the frequency-converted TXQ signal output from the frequency converter 24 with the frequency-converted TXI signal output from the frequency converter 25, and outputs the TXO signal which is a synthesized signal thereof.

Upon receiving the TXO signal from the signal synthesis unit 26 of the quadrature modulator 3, the signal branching unit 31 of the quadrature demodulator 4 branches the TXO signal into two, outputs one TXO signal to the frequency converter 33, and outputs the other TXO signal to the frequency converter 34.

The 90° phase difference generating unit 37 of the quadrature demodulator 4 outputs the first reception local signal having the same frequency as the local signal generated by the local signal generating unit 1 from the terminal a to the frequency converter 33.

In addition, since the 90° phase difference generating unit 37 is in mode (21), the 90° phase difference generating unit 37 outputs the second reception local signal having a phase ahead of the first reception local signal by 90° from the terminal b to the frequency converter 34.

The frequency converter 33 of the quadrature demodulator 4 converts the frequency of one TXO signal branched by the signal branching unit 31 using the first reception local signal output from the terminal a of the 90° phase difference generating unit 37, and outputs the RXI signal which is the frequency-converted TXO signal to the signal path 35.

The frequency converter 34 of the quadrature demodulator 4 converts the frequency of the other TXO signal branched by the signal branching unit 31 using the second reception local signal output from the terminal b of the 90° phase difference generating unit 37, and outputs the RXQ signal which is the frequency-converted TXO signal to the signal path 36.

The RXI signal output from the frequency converter 33 of the quadrature demodulator 4 passes through the signal path 35.

As a result, a frequency characteristic of the signal path 35, that is, a frequency characteristic of a passing loss of G3 and a frequency characteristic of a passing phase of θ3 are added to the RXI signal.

The RXQ signal output from the frequency converter 34 of the quadrature demodulator 4 passes through the signal path 36.

As a result, a frequency characteristic of the signal path 36, that is, a frequency characteristic of a passing loss of G4 and a frequency characteristic of a passing phase of θ4 are added to the RXQ signal.

The A/D converter 41 of the reception baseband unit 5 performs A/D conversion on the RXI signal that has passed through the signal path 35, and outputs the RXI signal which is a digital signal.

The A/D converter 42 of the reception baseband unit 5 performs A/D conversion on the RXQ signal that has passed through the signal path 36, and outputs the RXQ signal which is a digital signal.

Since the TX control unit 51 of the transmission baseband unit 2 is in mode (21), the TX control unit 51 outputs a command indicating that a signal input is to be output from the terminal a to the RXISW 46 and the RXQSW 47 as a switching command of signals input to the RXISW 46 and the RXQSW 47.

The RXISW 46 of the second signal exchanger 45 outputs the RXI signal which is an output signal of the A/D converter 41, input to the terminal a, to the RXI signal processing unit 43 on the basis of the switching command output from the TX control unit 51.

The RXQSW 47 of the second signal exchanger 45 outputs the RXQ signal which is an output signal of the A/D converter 42, input to the terminal a, to the RXQ signal processing unit 44 on the basis of the switching command output from the TX control unit 51.

Upon receiving the RXI signal from the RXISW 46, the RXI signal processing unit 43 of the reception baseband unit 5 measures the RXI signal.

Upon receiving the RXQ signal from the RXQSW 47, the RXQ signal processing unit 44 of the reception baseband unit 5 measures the RXQ signal.

Here, the RXI signal measured by the RXI signal processing unit 43 is expressed by the following formula (11).

$$RXI = 0.5\ A(G2 \times G3)\cos(\theta + (\theta 2 + \theta 3)) \quad (11)$$

In addition, the RXQ signal measured by the RXQ signal processing unit 44 is expressed by the following formula (12).

$$RXQ = 0.5\ A(G1 \times G4)\sin(\theta + (\theta 1 + \theta 4)) \quad (12)$$

Next, processing for measuring the RXI signal and the RXQ signal by operating the transceiver in mode (12) will be described.

In mode (12), the TXI signal is output from the terminal a of the TXISW 14 to the D/A converter 16, and the TXQ signal is output from the terminal a of the TXQSW 15 to the D/A converter 17.

In addition, in mode (12), the RXISW 46 outputs a signal input from the terminal b, and the RXQSW 47 outputs a signal input from the terminal b.

In mode (12), the second transmission local signal output from the terminal b of the 90° phase difference generating unit 23 has a phase ahead of the first transmission local signal output from the terminal a of the 90° phase difference generating unit 23 by 90°.

In addition, in mode (12), the second reception local signal output from the terminal b of the 90° phase difference generating unit 37 has a phase behind the first reception local signal output from the terminal a of the 90° phase difference generating unit 37 by 90°.

The TXI signal generating unit 11 of the transmission baseband unit 2 generates a TXI signal of a transmission wave and outputs the TXI signal to the TXISW 14 of the first signal exchanger 13.

The TXQ signal generating unit 12 of the transmission baseband unit 2 generates a TXQ signal of a transmission wave and outputs the TXQ signal to the TXQSW 15 of the first signal exchanger 13.

Since the TX control unit 51 of the transmission baseband unit 2 is in mode (12), the TX control unit 51 outputs a command indicating that a signal is output from the terminal a to the TXISW 14 and the TXQSW 15 as a switching command of signals output from the TXISW 14 and the TXQSW 15.

The TXISW 14 of the first signal exchanger 13 outputs the TXI signal generated by the TXI signal generating unit 11 from the terminal a to the D/A converter 16 on the basis of the switching command output from the TX control unit 51.

The TXQSW 15 of the first signal exchanger 13 outputs the TXQ signal generated by the TXQ signal generating unit 12 from the terminal a to the D/A converter 17 on the basis of the switching command output from the TX control unit 51.

The D/A converter 16 of the transmission baseband unit 2 performs D/A conversion on the TXI signal output from the terminal a of the TXISW 14 and outputs the TXI signal which is an analog signal to the signal path 21.

The D/A converter 17 of the transmission baseband unit 2 performs D/A conversion on the TXQ signal output from the terminal a of the TXQSW 15 and outputs the TXQ signal which is an analog signal to the signal path 22.

The TXI signal output from the D/A converter 16 of the transmission baseband unit 2 passes through the signal path 21.

As a result, a frequency characteristic of the signal path 21, that is, a frequency characteristic of a passing loss of G1 and a frequency characteristic of a passing phase of θ1 are added to the TXI signal.

The TXQ signal output from the D/A converter 17 of the transmission baseband unit 2 passes through the signal path 22.

As a result, a frequency characteristic of the signal path 22, that is, a frequency characteristic of a passing loss of G2 and a frequency characteristic of a passing phase of θ2 are added to the TXQ signal.

The 90° phase difference generating unit 23 of the quadrature modulator 3 outputs the first transmission local signal having the same frequency as the local signal generated by the local signal generating unit 1 from the terminal a to the frequency converter 24.

In addition, since the 90° phase difference generating unit 23 is in mode (12), the 90° phase difference generating unit 23 outputs the second transmission local signal having a phase ahead of the first transmission local signal by 90° from the terminal b to the frequency converter 25.

The frequency converter 24 of the quadrature modulator 3 converts the frequency of the TXI signal which is an analog signal that has passed through the signal path 21 using the first transmission local signal output from the terminal a of the 90° phase difference generating unit 23, and outputs the frequency-converted TXI signal to the signal synthesis unit 26.

The frequency converter 25 of the quadrature modulator 3 converts the frequency of the TXQ signal which is an analog signal that has passed through the signal path 22 using the second transmission local signal output from the terminal b of the 90° phase difference generating unit 23, and outputs the frequency-converted TXQ signal to the signal synthesis unit 26.

The signal synthesis unit 26 of the quadrature modulator 3 synthesizes the frequency-converted TXI signal output from the frequency converter 24 with the frequency-converted TXQ signal output from the frequency converter 25, and outputs a TXO signal which is a synthesized signal thereof.

Upon receiving the TXO signal from the signal synthesis unit 26 of the quadrature modulator 3, the signal branching unit 31 of the quadrature demodulator 4 branches the TXO signal into two, outputs one TXO signal to the frequency converter 33, and outputs the other TXO signal to the frequency converter 34.

The 90° phase difference generating unit 37 of the quadrature demodulator 4 outputs the first reception local signal having the same frequency as the local signal generated by the local signal generating unit 1 from the terminal a to the frequency converter 33.

In addition, since the 90° phase difference generating unit 37 is in mode (12), the 90° phase difference generating unit 37 outputs the second reception local signal having a phase behind the first reception local signal by 90° from the terminal b to the frequency converter 34.

The frequency converter 33 of the quadrature demodulator 4 converts the frequency of one TXO signal branched by the signal branching unit 31 using the first reception local signal output from the terminal a of the 90° phase difference generating unit 37, and outputs the RXQ signal which is the frequency-converted TXO signal to the signal path 35.

The frequency converter 34 of the quadrature demodulator 4 converts the frequency of the other TXO signal branched by the signal branching unit 31 using the second reception local signal output from the terminal b of the 90° phase difference generating unit 37, and outputs the RXI signal which is the frequency-converted TXO signal to the signal path 36.

The RXQ signal output from the frequency converter 33 of the quadrature demodulator 4 passes through the signal path 35.

As a result, a frequency characteristic of the signal path 35, that is, a frequency characteristic of a passing loss of G3 and a frequency characteristic of a passing phase of θ3 are added to the RXQ signal.

The RXI signal output from the frequency converter 34 of the quadrature demodulator 4 passes through the signal path 36.

As a result, a frequency characteristic of the signal path 36, that is, a frequency characteristic of a passing loss of G4 and a frequency characteristic of a passing phase of θ4 are added to the RXI signal.

The A/D converter 41 of the reception baseband unit 5 performs A/D conversion on the RXQ signal that has passed through the signal path 35, and outputs the RXQ signal which is a digital signal.

The A/D converter 42 of the reception baseband unit 5 performs A/D conversion on the RXI signal that has passed through the signal path 36, and outputs the RXI signal which is a digital signal.

Since the TX control unit 51 of the transmission baseband unit 2 is in mode (12), the TX control unit 51 outputs a command indicating that a signal input is to be output from the terminal b to the RXISW 46 and the RXQSW 47 as a switching command of signals input to the RXISW 46 and the RXQSW 47.

The RXISW 46 of the second signal exchanger 45 outputs an RXI signal which is an output signal of the A/D converter 42, input to the terminal b, to the RXI signal processing unit 43 on the basis of the switching command output from the TX control unit 51.

The RXQSW 47 of the second signal exchanger 45 outputs the RXQ signal which is an output signal of the A/D converter 41, input to the terminal b, to the RXQ signal processing unit 44 on the basis of the switching command output from the TX control unit 51.

Upon receiving the RXI signal from the RXISW 46, the RXI signal processing unit 43 of the reception baseband unit 5 measures the RXI signal.

Upon receiving the RXQ signal from the RXQSW 47, the RXQ signal processing unit 44 of the reception baseband unit 5 measures the RXQ signal.

Here, the RXI signal measured by the RXI signal processing unit 43 is expressed by the following formula (13).

$$RXI = 0.5\ A(G1 \times G4)\cos(\theta + (\theta 1 + \theta 4)) \quad (13)$$

In addition, the RXQ signal measured by the RXQ signal processing unit 44 is expressed by the following formula (14).

$$RXQ = 0.5\ A(G2 \times G3)\sin(\theta + (\theta 2 + \theta 3)) \quad (14)$$

Next, processing for measuring the RXI signal and the RXQ signal by operating the transceiver in mode (22) will be described.

In mode (22), the TXI signal is output from the terminal b of the TXISW 14 to the D/A converter 17, and the TXQ signal is output from the terminal b of the TXQSW 15 to the D/A converter 16.

In addition, in mode (22), the RXISW 46 outputs a signal input from the terminal b, and the RXQSW 47 outputs a signal input from the terminal b.

In mode (22), the second transmission local signal output from the terminal b of the 90° phase difference generating unit 23 has a phase behind the first transmission local signal output from the terminal a of the 90° phase difference generating unit 23 by 90°.

In addition, in mode (22), the second reception local signal output from the terminal b of the 90° phase difference generating unit 37 has a phase behind the first reception local signal output from the terminal a of the 90° phase difference generating unit 37 by 90°.

The TXI signal generating unit 11 of the transmission baseband unit 2 generates a TXI signal of a transmission wave and outputs the TXI signal to the TXISW 14 of the first signal exchanger 13.

The TXQ signal generating unit 12 of the transmission baseband unit 2 generates a TXQ signal of a transmission wave and outputs the TXQ signal to the TXQSW 15 of the first signal exchanger 13.

Since the TX control unit 51 of the transmission baseband unit 2 is in mode (22), the TX control unit 51 outputs a command indicating that a signal is to be output from the terminal b to the TXISW 14 and the TXQSW 15 as a switching command of signals output from the TXISW 14 and the TXQSW 15.

The TXISW 14 of the first signal exchanger 13 outputs the TXI signal generated by the TXI signal generating unit 11 from the terminal b to the D/A converter 17 on the basis of the switching command output from the TX control unit 51.

The TXQSW 15 of the first signal exchanger 13 outputs the TXQ signal generated by the TXQ signal generating unit 12 from the terminal b to the D/A converter 16 on the basis of the switching command output from the TX control unit 51.

The D/A converter 16 of the transmission baseband unit 2 performs D/A conversion on the TXQ signal output from the terminal b of the TXQSW 15 and outputs the TXQ signal which is an analog signal to the signal path 21.

The D/A converter 17 of the transmission baseband unit 2 performs D/A conversion on the TXI signal output from the terminal b of the TXISW 14 and outputs the TXI signal which is an analog signal to the signal path 22.

The TXQ signal output from the D/A converter 16 of the transmission baseband unit 2 passes through the signal path 21.

As a result, a frequency characteristic of the signal path 21, that is, a frequency characteristic of a passing loss of G1 and a frequency characteristic of a passing phase of θ1 are added to the TXQ signal.

The TXI signal output from the D/A converter 17 of the transmission baseband unit 2 passes through the signal path 22.

As a result, a frequency characteristic of the signal path 22, that is, a frequency characteristic of a passing loss of G2 and a frequency characteristic of a passing phase of θ2 are added to the TXI signal.

The 90° phase difference generating unit 23 of the quadrature modulator 3 outputs the first transmission local signal having the same frequency as the local signal generated by the local signal generating unit 1 from the terminal a to a frequency converter 24.

In addition, since the 90° phase difference generating unit 23 is in mode (22), the 90° phase difference generating unit 23 outputs the second transmission local signal having a phase behind the first transmission local signal by 90° from the terminal b to the frequency converter 25.

The frequency converter 24 of the quadrature modulator 3 converts the frequency of the TXQ signal which is an analog signal that has passed through the signal path 21 using the first transmission local signal output from the terminal a of the 90° phase difference generating unit 23, and outputs the frequency-converted TXQ signal to the signal synthesis unit 26.

The frequency converter 25 of the quadrature modulator 3 converts the frequency of the TXI signal which is an analog signal that has passed through the signal path 22 using the second transmission local signal output from the terminal b of the 90° phase difference generating unit 23, and outputs the frequency-converted TXI signal to the signal synthesis unit 26.

The signal synthesis unit 26 of the quadrature modulator 3 synthesizes the frequency-converted TXQ signal output from the frequency converter 24 with the frequency-converted TXI signal output from the frequency converter 25, and outputs the TXO signal which is a synthesized signal thereof.

Upon receiving the TXO signal from the signal synthesis unit 26 of the quadrature modulator 3, the signal branching unit 31 of the quadrature demodulator 4 branches the TXO signal into two, outputs one TXO signal to the frequency converter 33, and outputs the other TXO signal to the frequency converter 34.

The 90° phase difference generating unit 37 of the quadrature demodulator 4 outputs the first reception local signal having the same frequency as the local signal generated by the local signal generating unit 1 from the terminal a to the frequency converter 33.

In addition, since the 90° phase difference generating unit 37 is in mode (22), the 90° phase difference generating unit 37 outputs the second reception local signal having a phase behind the first reception local signal by 90° from the terminal b to the frequency converter 34.

The frequency converter 33 of the quadrature demodulator 4 converts the frequency of one TXO signal branched by the signal branching unit 31 using the first reception local signal output from the terminal a of the 90° phase difference generating unit 37, and outputs the RXQ signal which is the frequency-converted TXO signal to the signal path 35.

The frequency converter 34 of the quadrature demodulator 4 converts the frequency of the other TXO signal branched by the signal branching unit 31 using the second reception local signal output from the terminal b of the 90° phase difference generating unit 37, and outputs the RXI signal which is the frequency-converted TXO signal to the signal path 36.

The RXQ signal output from the frequency converter 33 of the quadrature demodulator 4 passes through the signal path 35.

As a result, a frequency characteristic of the signal path 35, that is, a frequency characteristic of a passing loss of G3 and a frequency characteristic of a passing phase of θ3 are added to the RXQ signal.

The RXI signal output from the frequency converter 34 of the quadrature demodulator 4 passes through the signal path 36.

As a result, a frequency characteristic of the signal path 36, that is, a frequency characteristic of a passing loss of G4 and a frequency characteristic of a passing phase of θ4 are added to the RXI signal.

The A/D converter 41 of the reception baseband unit 5 performs A/D conversion on the RXQ signal that has passed through the signal path 35, and outputs the RXQ signal which is a digital signal.

The A/D converter 42 of the reception baseband unit 5 performs A/D conversion on the RXI signal that has passed through the signal path 36, and outputs the RXI signal which is a digital signal.

Since the TX control unit 51 of the transmission baseband unit 2 is in mode (22), the TX control unit 51 outputs a command indicating that a signal input to the terminal b is to be output to the RXISW 46 and the RXQSW 47 as a switching command of signals input to the RXISW 46 and the RXQSW 47.

The RXISW 46 of the second signal exchanger 45 outputs the RXI signal which is an output signal of the A/D converter 42, input to the terminal b, to the RXI signal processing unit 43 on the basis of the switching command output from the TX control unit 51.

The RXQSW 47 of the second signal exchanger 45 outputs the RXQ signal which is an output signal of the A/D converter 41, input to the terminal b, to the RXQ signal processing unit 44 on the basis of the switching command output from the TX control unit 51.

Upon receiving the RXI signal from the RXISW 46, the RXI signal processing unit 43 of the reception baseband unit 5 measures the RXI signal.

Upon receiving the RXQ signal from the RXQSW 47, the RXQ signal processing unit 44 of the reception baseband unit 5 measures the RXQ signal.

Here, the RXI signal measured by the RXI signal processing unit 43 is expressed by the following formula (15).

$$RXI=0.5\ A(G2 \times G4)\cos(\theta+(\theta2+\theta4)) \quad (15)$$

In addition, the RXQ signal measured by the RXQ signal processing unit 44 is expressed by the following formula (16).

$$RXQ=0.5\ A(G1 \times G3)\sin(\theta+(\theta1+\theta3)) \quad (16)$$

When the RXI signal and the RXQ signal are measured in mode (11), mode (21), mode (12), and mode (22), in a case where the TX control unit 51 tries to eliminate an image component generated in the TXO signal, the TX control unit 51 calculates a difference between a frequency characteristic of the signal path 21 and a frequency characteristic of the signal path 22.

That is, for example, the TX control unit 51 derives an amplitude ratio (G1/G2) which is a ratio between the passing loss G1 of the signal path 21 and the passing loss G2 of the signal path 22 from the RXI signal measured by the RXI signal processing unit 43 in mode (11) and indicated by formula (9) and the RXI signal measured by the RXI signal processing unit 43 in mode (21) and indicated by formula (11).

As illustrated in the following formula (17), the amplitude ratio (G1/G2) can be derived by dividing 0.5 A (G1×G3) which is the amplitude of the RXI signal indicated by formula (9) by 0.5 A (G2×G3) which is the amplitude of the RXI signal indicated by formula (11).

$$G1/G2=(0.5\ A(G1 \times G3))/(0.5\ A(G2 \times G3)) \quad (17)$$

In addition, the TX control unit 51 derives a phase difference ($\theta1-\theta2$) which is a difference between the passing phase $\theta1$ of the signal path 21 and the passing phase $\theta2$ of the signal path 22 from the RXI signal measured by the RXI signal processing unit 43 in mode (11) and indicated by formula (9) and the RXI signal measured by the RXI signal processing unit 43 in mode (21) and indicated by formula (11).

As illustrated in the following formula (18), the phase difference ($\theta1-\theta2$) can be derived by subtracting $\theta+(\theta2+\theta3)$ which is the phase of the RXI signal indicated by formula (11) from $\theta+(\theta1+\theta3)$ which is the phase of the RXI signal indicated by formula (9).

$$\theta1-\theta2=(\theta+(\theta1+\theta3))-(\theta+(\theta2+\theta3)) \quad (18)$$

Here, in order to derive the amplitude ratio (G1/G2) and the phase difference ($\theta1-\theta2$), the TX control unit 51 uses the RXI signal indicated by formula (9) and the RXI signal indicated by formula (11), but may use the RXQ signal indicated by formula (10) and the RXQ signal indicated by formula (12).

That is, the TX control unit 51 may derive the amplitude ratio (G1/G2) and the phase difference ($\theta1-\theta2$) from the RXQ signal measured by the RXQ signal processing unit 44 in mode (11) and indicated by formula (10) and the RXQ signal measured by the RXQ signal processing unit 44 in mode (21) and indicated by formula (12).

As illustrated in the following formula (19), the amplitude ratio (G1/G2) can be derived by dividing 0.5 A (G1×G4) which is the amplitude of the RXQ signal indicated by formula (12) by 0.5 A (G2×G4) which is the amplitude of the RXQ signal indicated by formula (10).

$$G1/G2=(0.5\ A(G1 \times G4))/(0.5\ A(G2 \times G4)) \quad (19)$$

As illustrated in the following formula (20), the phase difference ($\theta1-\theta2$) can be derived by subtracting $\theta+(\theta2+\theta4)$ which is the phase of the RXQ signal indicated by formula (10) from $\theta+(\theta1+\theta4)$ which is the phase of the RXQ signal indicated by formula (12).

$$\theta1-\theta2=(\theta+(\theta1+\theta4))-(\theta+(\theta2+\theta4)) \quad (20)$$

Upon deriving the amplitude ratio (G1/G2) and the phase difference ($\theta1-\theta2$), the TX control unit 51 controls the equalizer process of the TXI signal generating unit 11 and the equalizer process of the TXQ signal generating unit 12 so that the amplitude ratio (G1/G2) is 1 and the phase difference ($\theta1-\theta2$) is zero.

That is, the TX control unit 51 controls the amplitude and phase of the TXI signal generated by the TXI signal generating unit 11 and the amplitude and phase of the TXQ signal generated by the TXQ signal generating unit 12 so that the amplitude ratio (G1/G2) is 1 and the phase difference ($\theta1-\theta2$) is zero.

As a result, even when the local signal generating unit 1 which is an analog circuit is commonly used by the quadrature modulator 3 and the quadrature demodulator 4, a difference between the frequency characteristic of the signal path 21 and the frequency characteristic of the signal path 22 can be compensated.

By compensating the difference between the frequency characteristic of the signal path 21 and the frequency characteristic of the signal path 22, it is possible to suppress generation of an image component in the TXO signal.

In addition, in a case where the TX control unit 51 tries to eliminate deterioration of a reception characteristic due to a difference between a frequency characteristic of the signal path 35 and a frequency characteristic of the signal path 36, the TX control unit 51 calculates a difference between the frequency characteristic of the signal path 35 and the frequency characteristic of the signal path 36.

That is, for example, the TX control unit 51 derives an amplitude ratio (G3/G4) which is a ratio between the passing loss G3 of the signal path 35 and the passing loss G4 of the signal path 36 from the RXI signal measured by the RXI signal processing unit 43 in mode (12) and indicated by formula (13) and the RXI signal measured by the RXI signal processing unit 43 in mode (11) and indicated by formula (9).

As illustrated in the following formula (21), the amplitude ratio (G3/G4) can be derived by dividing 0.5 A (G1×G3) which is the amplitude of the RXI signal indicated by formula (9) by 0.5 A (G1×G4) which is the amplitude of the RXI signal indicated by formula (13).

$$G3/G4=(0.5\ A(G1 \times G3))/(0.5\ A(G1 \times G4)) \quad (21)$$

As illustrated in the following formula (22), the phase difference ($\theta3-\theta4$) can be derived by subtracting $\theta+(\theta1+\theta4)$ which is the phase of the RXI signal indicated by formula (13) from $\theta+(\theta1+\theta3)$ which is the phase of the RXI signal indicated by formula (9).

$$\theta3-\theta4=(\theta+(\theta1+\theta3))-(\theta+(\theta1+\theta4)) \quad (22)$$

Here, in order to derive the amplitude ratio (G3/G4) and the phase difference ($\theta3-\theta4$), the TX control unit 51 uses the RXI signal indicated by formula (13) and the RXI signal indicated by formula (9), but may use the RXQ signal indicated by formula (14) and the RXQ signal indicated by formula (10).

That is, the TX control unit 51 may derive the amplitude ratio (G3/G4) and the phase difference ($\theta3-\theta4$) from the RXQ signal measured by the RXQ signal processing unit 44 in mode (12) and indicated by formula (14) and the RXQ signal measured by the RXQ signal processing unit 44 in mode (11) and indicated by formula (10).

As illustrated in the following formula (23), the amplitude ratio (G3/G4) can be derived by dividing 0.5 A (G2×G3) which is the amplitude of the RXQ signal indicated by formula (14) by 0.5 A (G2×G4) which is the amplitude of the RXQ signal indicated by formula (10).

$$G3/G4=(0.5\ A(G2\times G3))/(0.5\ A(G2\times G4)) \quad (23)$$

As illustrated in the following formula (24), the phase difference (θ3−θ4) can be derived by subtracting θ+(θ2+θ4) which is the phase of the RXQ signal indicated by formula (10) from θ+(θ2+θ3) which is the phase of the RXQ signal indicated by formula (14).

$$θ3-θ4=(θ+(θ2+θ3))-(θ+(θ2+θ4)) \quad (24)$$

Here, when the amplitude ratio (G3/G4) and the phase difference (θ3−θ4) are derived, the equalizer process of the RXI signal processing unit 43 and the equalizer process of the RXQ signal processing unit 44 are controlled so that the amplitude ratio (G3/G4) is 1 and the phase difference (θ3−θ4) is zero.

That is, the amplitude and phase of the RXI signal processed by the RXI signal processing unit 43 and the amplitude and phase of the RXQ signal processed by the RXQ signal processing unit 44 are controlled so that the amplitude ratio (G3/G4) is 1 and the phase difference (θ3−θ4) is zero.

As a result, even when the local signal generating unit 1 which is an analog circuit is commonly used by the quadrature modulator 3 and the quadrature demodulator 4, a difference between the frequency characteristic of the signal path 35 and the frequency characteristic of the signal path 36 can be compensated.

By compensating the difference between the frequency characteristic of the signal path 35 and the frequency characteristic of the signal path 36, it is possible to suppress deterioration of a reception characteristic due to the difference.

As is apparent from the above, according to the second embodiment, it is configured to include the second signal exchanger 45 for exchanging signals output from the signal path 35 and the signal path 36 to the reception baseband unit 5, and to include the TX control unit 51 for controlling generation of the TXI signal and the TXQ signal in the transmission baseband unit 2 and processing of the RXI signal and the RXQ signal in the reception baseband unit 5 on the basis of a measurement result of the reception baseband unit 5 before and after exchange of the signals by the second signal exchanger 45.

As a result, in addition to obtaining similar effects to those of the first embodiment, the transceiver can obtain an effect of suppressing deterioration of the reception characteristic due to the difference between the frequency characteristic of the signal path 35 and the frequency characteristic of the signal path 36.

Third Embodiment

When the length of a wire connecting the local signal generating unit 1 and the 90° phase difference generating unit 23 of the quadrature modulator 3 is equal to the length of a wire connecting the local signal generating unit 1 and the 90° phase difference generating unit 32 of the quadrature demodulator 4, the phase of a local signal input to the 90° phase difference generating unit 23 is equal to the phase of a local signal input to the 90° phase difference generating unit 32.

However, when the lengths of the two wires are different from each other, the phase of the local signal input to the 90° phase difference generating unit 23 is not equal to the phase of the local signal input to the 90° phase difference generating unit 32, and a communication characteristic of the transceiver is deteriorated.

In a third embodiment, a transceiver capable of suppressing deterioration of a communication characteristic even when the lengths of the two wires are different from each other will be described.

Figure 3:
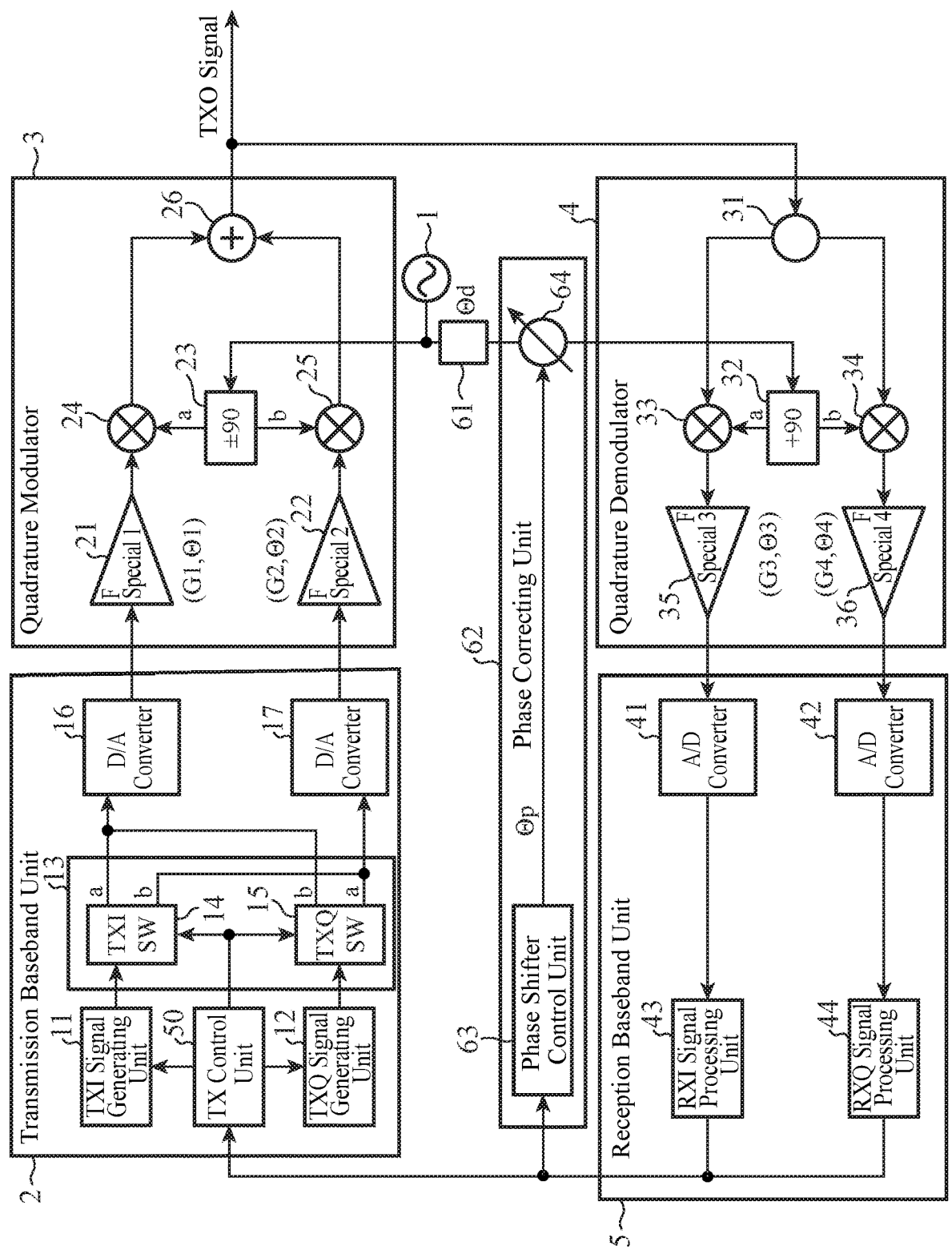
FIG. 3 is a configuration diagram illustrating a transceiver according to a third embodiment of the present invention.

FIG. 3 is a configuration diagram illustrating a transceiver according to the third embodiment of the present invention. In FIG. 3, the same reference numerals as those in FIG. 1 denote the same or corresponding parts, and therefore description thereof will be omitted.

A delay wire 61 is a line having a length corresponding to a difference between the length of a wire connecting a local signal generating unit 1 and a 90° phase difference generating unit 23 of a quadrature modulator 3 and the length of a wire connecting the local signal generating unit 1 and a 90° phase difference generating unit 32 of a quadrature demodulator 4.

As a result, the phase of a local signal input to the 90° phase difference generating unit 32 of the quadrature demodulator 4 is behind the phase of a local signal input to the 90° phase difference generating unit 23 of the quadrature modulator 3 by θd.

A phase correcting unit 62 includes a phase shifter control unit 63 and a phase shifter 64.

The phase correcting unit 62 specifies a phase shift amount −θp corresponding to the phase difference θd between a local signal supplied from the local signal generating unit 1 to the 90° phase difference generating unit 23 of the quadrature modulator 3 and a local signal supplied from the local signal generating unit 1 to the 90° phase difference generating unit 32 of the quadrature demodulator 4 from an RXI signal measured by an RXI signal processing unit 43 and an RXQ signal measured by an RXQ signal processing unit 44.

In addition, the phase correcting unit 62 corrects the phase of a local signal supplied to the 90° phase difference generating unit 32 of the quadrature demodulator 4 on the basis of the specified phase shift amount −θp.

The phase shifter control unit 63 specifies the phase shift amount −θp=θd corresponding to the phase difference θd from the RXI signal measured by the RXI signal processing unit 43 and the RXQ signal measured by the RXQ signal processing unit 44, and sets the passing phase of the phase shifter 64 to −θd on the basis of the specified phase shift amount −θp.

The phase shifter 64 shifts the phase of a local signal that has been output from the local signal generating unit 1 and then has passed through the delay wire 61 by the phase shift amount of −θp. That is, the phase shifter 64 advances the phase of the local signal that has passed through the delay wire 61 by θp.

In the third embodiment, an example in which the delay wire 61 and the phase correcting unit 62 are applied to the transceiver in FIG. 1 will be described. However, the delay wire 61 and the phase correcting unit 62 may be applied to the transceiver in FIG. 2.

Next, the operation will be described.

In the third embodiment, when the phase correcting unit 62 corrects the phase of a local signal, for example, the transceiver is operated in mode (1) described in the first embodiment, and the RXI signal and the RXQ signal are measured.

Since a TX control unit 50 of a transmission baseband unit 2 is in mode (1), the TX control unit 50 outputs a command indicating that a signal is to be output from the terminal a to the TXISW 14 and a TXQSW 15 as a switching command of signals output from the TXISW 14 and the TXQSW 15.

The TXISW 14 of a first signal exchanger 13 outputs a TXI signal generated by a TXI signal generating unit 11 from the terminal a to a D/A converter 16 on the basis of the switching command output from the TX control unit 50.

The TXQSW 15 of the first signal exchanger 13 outputs a TXQ signal generated by a TXQ signal generating unit 12 from the terminal a to a D/A converter 17 on the basis of the switching command output from the TX control unit 50.

In a case where the transceiver is operated in mode (1), the RXI signal is measured by the RXI signal processing unit 43, and the RXQ signal is measured by the RXQ signal processing unit 44 as in the first embodiment.

However, in the third embodiment, since there is an influence of the delay wire 61, the RXI signal measured by the RXI signal processing unit 43 is expressed by the following formula (25). In addition, the RXQ signal measured by the RXQ signal processing unit 44 is expressed by the following formula (26).

$$RXI = 0.5\ A((G1 \times G3) \times \cos(\theta+(\theta 1+\theta 3)) \times \cos\theta d + (G2 \times G3) \times \sin(\theta+(\theta 2+\theta 3)) \times \sin\theta d) \quad (25)$$

$$RXQ = 0.5\ A(-(G1 \times G4) \times \cos(\theta+(\theta 1+\theta 4)) \times \sin\theta d + (G2 \times G4) \times \sin(\theta+(\theta 2+\theta 4)) \times \cos\theta d) \quad (26)$$

In the third embodiment, in order to be able to specify the phase shift amount $-\theta p$ corresponding to the phase difference $\theta d$ due to the influence of the delay wire 61, the TX control unit 50 controls the TXI signal generating unit 11 so that the amplitude of the TXI signal which is an output signal of the TXI signal generating unit 11 is zero.

When the TXI signal which is an output signal of the TXI signal generating unit 11 is 0, the RXI signal measured by the RXI signal processing unit 43 is expressed by the following formula (27). In addition, the RXQ signal measured by the RXQ signal processing unit 44 is expressed by the following formula (28).

$$RXI = 0.5\ A((G2 \times G3) \times \sin(\theta+(\theta 2+\theta 3)) \times \sin\theta d) \quad (27)$$

$$RXQ = 0.5\ A((G2 \times G4) \times \sin(\theta+(\theta 2+\theta 4)) \times \cos\theta d) \quad (28)$$

The phase shifter control unit 63 of the phase correcting unit 62 adjusts the phase shift amount $-\theta p$ of the phase shifter 64, that is, the passing phase $-\theta d$ of the phase shifter 64 so that the RXI signal measured by the RXI signal processing unit 43 and indicated by formula (27) is 0 (sin $\theta d=0$). In this case, $\theta d-\theta p$ is 0° or 180°.

By performing adjustment so that sin $\theta d$ is zero, the RXQ signal measured by the RXQ signal processing unit 44 is expressed by the following formula (29).

$$RXQ = 0.5\ A((G2 \times G4) \times \sin(\theta+(\theta 2+\theta 4)) \times \cos(\theta d-\theta p)) \quad (29)$$

Here, when the RXQ signal processing unit 44 measures a rotation direction with respect to a change of $\theta$ of RXQ indicated by formula (29), it can be determined whether $\theta d-\theta p$ is 0° or 180°. From the result, $-\theta p$ is set so that $\theta d-\theta p$ is 0° instead of 180°.

The phase shifter control unit 63 of the phase correcting unit 62 adjusts the phase shift amount $-\theta p$ of the phase shifter 64 and determines whether or not the RXI signal measured by the RXI signal processing unit 43 and indicated by formula (27) is zero.

On the basis of the result of the determination, the phase shifter control unit 63 specifies the phase shift amount $-\theta p$ when the RXI signal indicated by formula (27) is zero, and sets the passing phase of the phase shifter 64 to $-\theta d$ according to the specified phase shift amount $-\theta p$.

The phase shifter 64 of the phase correcting unit 62 shifts the phase of the local signal that has been output from the local signal generating unit 1 and then has passed through the delay wire 61 by the phase shift amount of $-\theta p$.

As a result, the phase of the local signal input to the 90° phase difference generating unit 23 of the quadrature modulator 3 is equal to the phase of the local signal input to the 90° phase difference generating unit 32 of the quadrature demodulator 4.

As a result, when the transceiver is operated in, for example, mode (1), the RXI signal measured by the RXI signal processing unit 43 is expressed by formula (1) as in the first embodiment.

In addition, the RXQ signal measured by the RXQ signal processing unit 44 is expressed by formula (2) as in the first embodiment.

As is apparent from the above, according to the third embodiment, it is configured to include the phase correcting unit 62 for specifying the phase shift amount $-\theta p$ corresponding to the phase difference $\theta d$ between the local signal supplied from the local signal generating unit 1 to the 90° phase difference generating unit 23 of the quadrature modulator 3 and the local signal supplied from the local signal generating unit 1 to the 90° phase difference generating unit 32 of the quadrature demodulator 4 from the measurement result of the reception baseband unit 5, and correcting the phase of the local signal supplied to the 90° phase difference generating unit 32 of the quadrature demodulator 4 according to the specified phase shift amount $-\theta p$.

As a result, it is possible to obtain a transceiver capable of suppressing deterioration of a communication characteristic even if there is a phase difference $\theta d$ between the local signal supplied to the 90° phase difference generating unit 23 of the quadrature modulator 3 and the local signal supplied to the 90° phase difference generating unit 32 of the quadrature demodulator 4.

Figure 4:
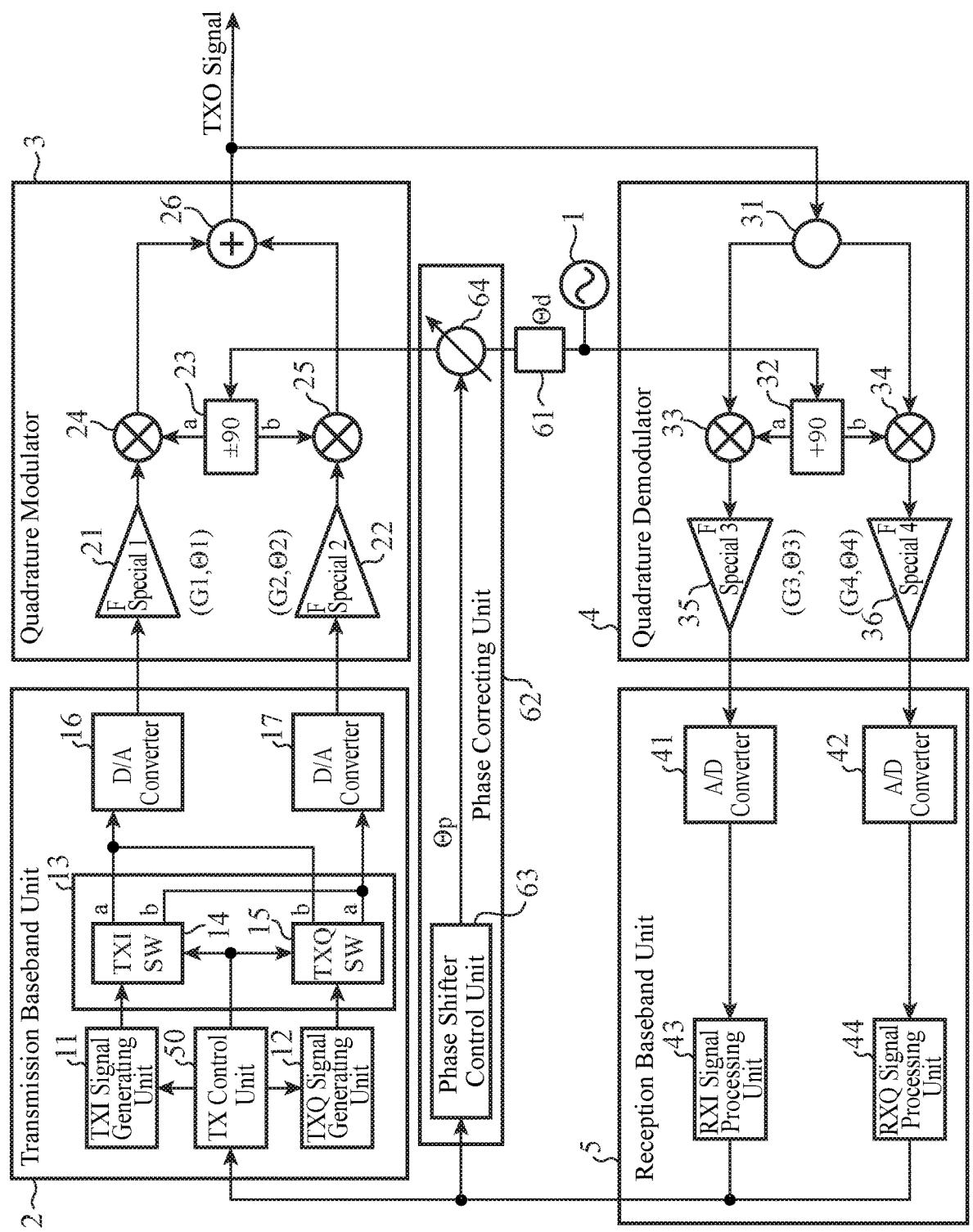
FIG. 4 is a configuration diagram illustrating another transceiver according to the third embodiment of the present invention.

In the third embodiment, an example is illustrated in which the delay wire 61 exists between the local signal generating unit 1 and the quadrature demodulator 4, but as illustrated in FIG. 4, the delay wire 61 may exist between the local signal generating unit 1 and the quadrature modulator 3.

FIG. 4 is a configuration diagram illustrating another transceiver according to the third embodiment of the present invention. In FIG. 4, the same reference numerals as those in FIG. 3 denote the same or corresponding parts, and therefore description thereof will be omitted.

In the example of FIG. 4, the phase shifter 64 of the phase correcting unit 62 is disposed between the local signal generating unit 1 and the quadrature modulator 3.

Fourth Embodiment

In the first to third embodiments, the example has been illustrated in which there is one set of the transmission baseband unit 2 and the quadrature modulator 3, but in a fourth embodiment, an example will be illustrated in which there is a plurality of sets of a transmission baseband unit 2 and a quadrature modulator 3.

Figure 5:
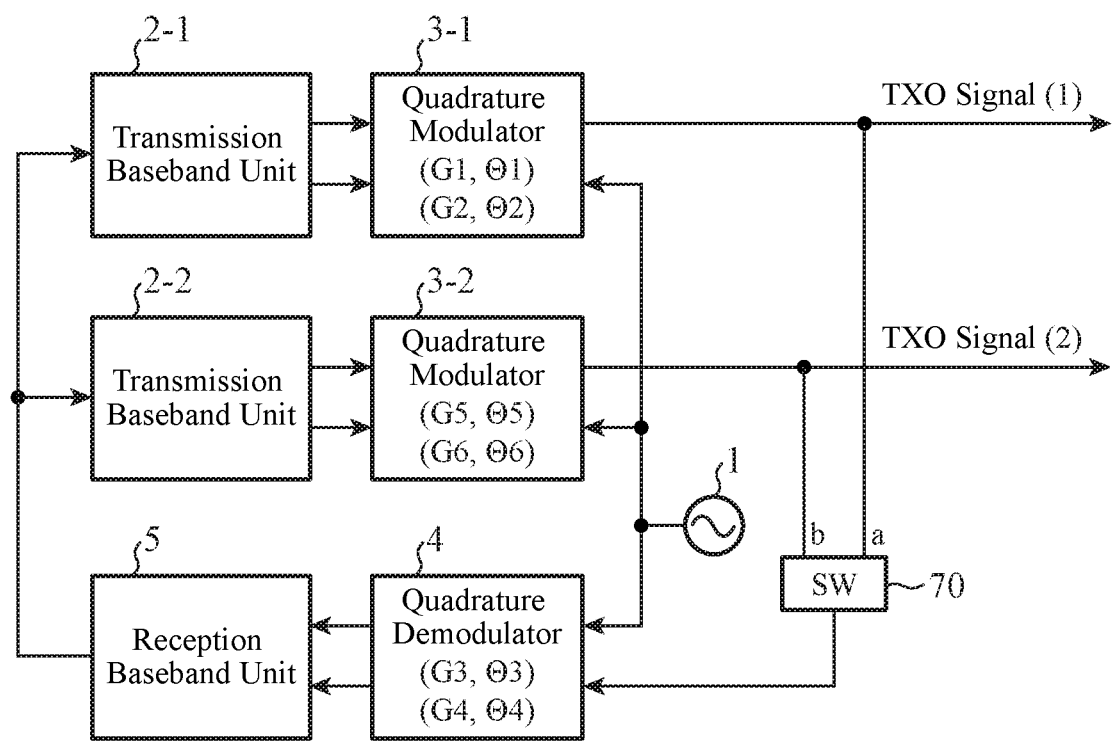
FIG. 5 is a configuration diagram illustrating a transceiver according to a fourth embodiment of the present invention.

FIG. 5 is a configuration diagram illustrating a transceiver according to the fourth embodiment of the present invention. In FIG. 5, the same reference numerals as those in FIG. 1 denote the same or corresponding parts, and therefore description thereof will be omitted.

In FIG. 5, the example is illustrated in which the number of sets of the transmission baseband unit 2 and the quadrature modulator 3 is two, but the number of sets of the transmission baseband unit 2 and the quadrature modulator 3 may be three or more.

Transmission baseband units 2-1 and 2-2 are transmission baseband units similar to the transmission baseband unit 2 in FIG. 1.

Quadrature modulators 3-1 and 3-2 are quadrature modulators similar to the quadrature modulator 3 in FIG. 1.

However, the frequency characteristics of signal paths 21 and 22 in the quadrature modulator 3-1 are the same as the frequency characteristics of the signal paths 21 and 22 in the quadrature modulator 3 in FIG. 1, whereas the frequency characteristics of the signal paths 21 and 22 in the quadrature modulator 3-2 are different from the frequency characteristics of the signal paths 21 and 22 in the quadrature modulator 3 in FIG. 1.

In the fourth embodiment, the signal path 21 in the quadrature modulator 3-2 is a path having a frequency characteristic of a passing loss of G5 and a frequency characteristic of a passing phase of θ5, and the signal path 22 in the quadrature modulator 3-2 is a path having a frequency characteristic of a passing loss of G6 and a frequency characteristic of a passing phase of θ6.

A signal selecting unit 70 has a terminal a connected to an output terminal of the quadrature modulator 3-1 and a terminal b connected to an output terminal of the quadrature modulator 3-2.

The signal selecting unit 70 selects one of a TXO signal (1) output from the quadrature modulator 3-1 and a TXO signal (2) output from the quadrature modulator 3-2, and outputs the selected TXO signal to a quadrature demodulator 4. In FIG. 5, the signal selecting unit 70 is expressed as "SW".

Out of TX control units 50 mounted on the transmission baseband units 2-1 and 2-2, a TX control unit 50 mounted on a transmission baseband unit 2 for generating a TXI signal and a TXQ signal as a generation source of the TXO signal selected by the signal selecting unit 70 controls generation of the TXI signal and the TXQ signal in the transmission baseband unit 2.

In the fourth embodiment, an example will be described in which the transmission baseband units 2-1 and 2-2, the quadrature modulators 3-1 and 3-2, and the signal selecting unit 70 are applied to the transceiver in FIG. 1, but the transmission baseband units 2-1 and 2-2, the quadrature modulators 3-1 and 3-2, and the signal selecting unit 70 may be applied to the transceiver in FIG. 2, 3, or 4.

Next, the operation will be described.

The TX control unit 50 of the transmission baseband unit 2-1, for example, sets the mode of the transceiver to mode (1) and outputs a command indicating that a signal from a terminal a is to be output to a TXISW 14 and a TXQSW 15.

At this time, the signal selecting unit 70 selects the TXO signal (1) output from the quadrature modulator 3-1 and outputs the TXO signal (1) to the quadrature demodulator 4.

As a result, the RXI signal measured by an RXI signal processing unit 43 of a reception baseband unit 5 is expressed by formula (1) as in the first embodiment.

Next, the TX control unit 50 of the transmission baseband unit 2-1, for example, sets the mode of the transceiver to mode (2) and outputs a command indicating that a signal is to be output from a terminal b to the TXISW 14 and the TXQSW 15.

At this time, the signal selecting unit 70 selects the TXO signal (1) output from the quadrature modulator 3-1 and outputs the TXO signal (1) to the quadrature demodulator 4.

As a result, the RXI signal measured by the RXI signal processing unit 43 of the reception baseband unit 5 is expressed by formula (3) as in the first embodiment.

In addition, the TX control unit 50 of the transmission baseband unit 2-2, for example, sets the mode of the transceiver to mode (1) and outputs a command indicating that a signal from the terminal a is to be output to the TXISW 14 and the TXQSW 15.

At this time, the signal selecting unit 70 selects the TXO signal (2) output from the quadrature modulator 3-2 and outputs the TXO signal (2) to the quadrature demodulator 4.

As a result, the RXI signal measured by the RXI signal processing unit 43 of the reception baseband unit 5 is expressed by the following formula (30).

$$RXI=0.5\ A(G5 \times G3)\cos(\theta+(\theta5+\theta3)) \quad (30)$$

Next, the TX control unit 50 of the transmission baseband unit 2-2, for example, sets the mode of the transceiver to mode (2) and outputs a command indicating that a signal is to be output from the terminal b to the TXISW 14 and the TXQSW 15.

At this time, the signal selecting unit 70 selects the TXO signal (2) output from the quadrature modulator 3-2 and outputs the TXO signal (2) to the quadrature demodulator 4.

As a result, the RXI signal measured by the RXI signal processing unit 43 of the reception baseband unit 5 is expressed by the following formula (31).

$$RXI=0.5\ A(G6 \times G3)\cos(\theta+(\theta6+\theta3)) \quad (31)$$

The TX control unit 50 of the transmission baseband unit 2-1 derives an amplitude ratio (G1/G2) which is a ratio between a passing loss G1 of the signal path 21 and a passing loss G2 of the signal path 22 in the quadrature modulator 3-1 from the RXI signal measured by the RXI signal processing unit 43 in mode (1) and indicated by formula (1) and the RXI signal measured by the RXI signal processing unit 43 in mode (2) and indicated by formula (3).

As illustrated in the above formula (5), the amplitude ratio (G1/G2) can be derived by dividing 0.5 A (G1×G3) which is the amplitude of the RXI signal indicated by formula (1) by 0.5 A (G2×G3) which is the amplitude of the RXI signal indicated by formula (3).

The TX control unit 50 of the transmission baseband unit 2-1 derives a phase difference (θ1−θ2) which is a difference between a passing phase θ1 of the signal path 21 and a passing phase θ2 of the signal path 22 in the quadrature modulator 3-1 from the RXI signal measured by the RXI signal processing unit 43 in mode (1) and indicated by formula (1) and the RXI signal measured by the RXI signal processing unit 43 in mode (2) and indicated by formula (3).

As illustrated in the following formula (6), the phase difference (θ1−θ2) can be derived by subtracting θ+(θ2+θ3) which is the phase of the RXI signal indicated by formula (3) from θ+(θ1+θ3) which is the phase of the RXI signal indicated by formula (1).

In addition, the TX control unit 50 of the transmission baseband unit 2-2 derives an amplitude ratio (G5/G6) which is a ratio between a passing loss G5 of the signal path 21 and a passing loss G6 of the signal path 22 in the quadrature modulator 3-2 from the RXI signal measured by the RXI signal processing unit 43 in mode (1) and indicated by formula (30) and the RXI signal measured by the RXI signal processing unit 43 in mode (2) and indicated by formula (31).

As illustrated in the following formula (32), the amplitude ratio (G5/G6) can be derived by dividing 0.5 A (G5×G3) which is the amplitude of the RXI signal indicated by formula (30) by 0.5 A (G6×G3) which is the amplitude of the RXI signal indicated by formula (31).

$$G5/G6=(0.5\ A(G5\times G3))/(0.5\ A(G6\times G3)) \quad (32)$$

The TX control unit 50 of the transmission baseband unit 2-2 derives a phase difference (θ5−θ6) which is a difference between a passing phase θ5 of the signal path 21 and a passing phase θ6 of the signal path 22 in the quadrature modulator 3-2 from the RXI signal measured by the RXI signal processing unit 43 in mode (1) and indicated by formula (30) and the RXI signal measured by the RXI signal processing unit 43 in mode (2) and indicated by formula (31).

As illustrated in the following formula (33), the phase difference (θ5−θ6) can be derived by subtracting θ+(θ6+θ3) which is the phase of the RXI signal indicated by formula (31) from θ+(θ5+θ3) which is the phase of the RXI signal indicated by formula (30).

$$\theta 1-\theta 2=(\theta+(\theta 5+\theta 3))-(\theta+(\theta 6+\theta 3)) \quad (33)$$

Upon deriving the amplitude ratio (G1/G2) and the phase difference (θ1−θ2), the TX control unit 50 of the transmission baseband unit 2-1 controls an equalizer process of a TXI signal generating unit 11 and an equalizer process of a TXQ signal generating unit 12 in the transmission baseband unit 2-1 so that the amplitude ratio (G1/G2) is 1 and the phase difference (θ1−θ2) is zero under a condition that the signal selecting unit 70 selects the TXO signal (1) output from the quadrature modulator 3-1.

That is, the TX control unit 50 of the transmission baseband unit 2-1 controls the amplitude and phase of a TXI signal generated by the TXI signal generating unit 11 of the transmission baseband unit 2-1 and the amplitude and phase of a TXQ signal generated by the TXQ signal generating unit 12 of the transmission baseband unit 2-1 so that the amplitude ratio (G1/G2) is 1 and the phase difference (θ1−θ2) is zero.

Upon deriving the amplitude ratio (G5/G6) and the phase difference (θ5−θ6), the TX control unit 50 of the transmission baseband unit 2-2 controls an equalizer process of a TXI signal generating unit 11 and an equalizer process of a TXQ signal generating unit 12 in the transmission baseband unit 2-2 so that the amplitude ratio (G5/G6) is 1 and the phase difference (θ5−θ6) is zero under a condition that the signal selecting unit 70 selects the TXO signal (2) output from the quadrature modulator 3-2.

That is, the TX control unit 50 of the transmission baseband unit 2-2 controls the amplitude and phase of a TXI signal generated by the TXI signal generating unit 11 of the transmission baseband unit 2-2 and the amplitude and phase of a TXQ signal generated by the TXQ signal generating unit 12 of the transmission baseband unit 2-2 so that the amplitude ratio (G5/G6) is 1 and the phase difference (θ5−θ6) is zero.

As a result, even when a local signal generating unit 1 which is an analog circuit is commonly used by the quadrature modulators 3-1 and 3-2 and the quadrature demodulator 4, a difference between the frequency characteristic of the signal path 21 in the quadrature modulators 3-1 and 3-2 and the frequency characteristic of the signal path 22 in the quadrature modulators 3-1 and 3-2 can be compensated.

By compensating the difference between the frequency characteristic of the signal path 21 in the quadrature modulators 3-1 and 3-2 and the frequency characteristic of the signal path 22 in the quadrature modulators 3-1 and 3-2, it is possible to suppress generation of an image component in the TXO signal (1) and the TXO signal (2).

Fifth Embodiment

In a fifth embodiment, the internal configuration of the 90° phase difference generating unit 23 in each of the quadrature modulators 3, 3-1, and 3-2 in FIGS. 1 to 5 will be described.

Figure 6:
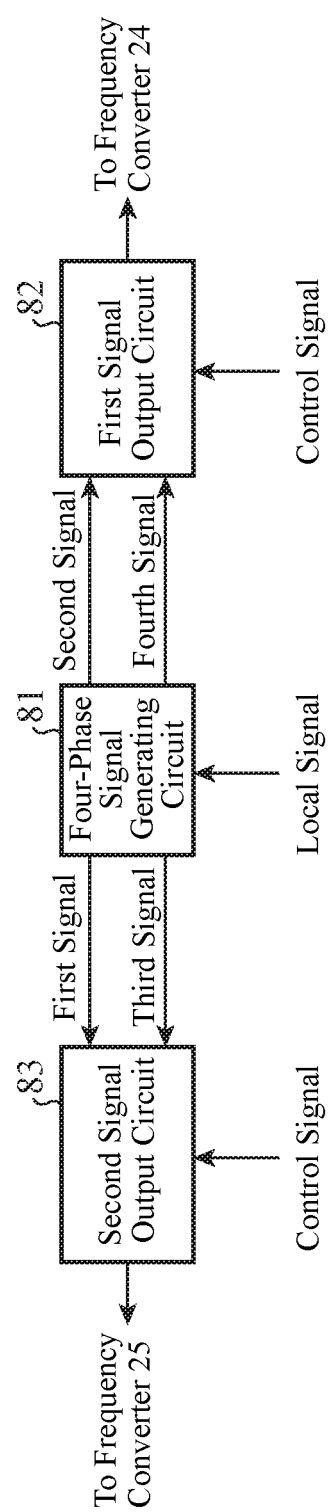
FIG. 6 is a configuration diagram illustrating a 90° phase difference generating unit 23 of a transceiver according to a fifth embodiment of the present invention.

FIG. 6 is a configuration diagram illustrating a 90° phase difference generating unit 23 of a transceiver according to the fifth embodiment of the present invention.

In FIG. 6, a four-phase signal generating circuit 81 generates a first signal having the same phase as a local signal generated by a local signal generating unit 1, a second signal having a phase ahead of the local signal by 90°, a third signal having a phase ahead of the local signal by 180°, and a fourth signal having a phase ahead of the local signal by 270°.

The four-phase signal generating circuit 81 outputs the second signal and the fourth signal to a first signal output circuit 82, and outputs the first signal and the third signal to a second signal output circuit 83.

The first signal output circuit 82 outputs the second signal or the fourth signal output from the four-phase signal generating circuit 81 to a frequency converter 24 as a first transmission local signal.

The second signal output circuit 83 outputs the first signal or the third signal output from the four-phase signal generating circuit 81 to a frequency converter 25 as a second transmission local signal.

The output signals of the first signal output circuit 82 and the second signal output circuit 83 are controlled, for example, on the basis of a control signal output from the TX control unit 50.

Next, the operation will be described.

The four-phase signal generating circuit 81 of the 90° phase difference generating unit 23 generates a first signal having the same phase as a local signal generated by the local signal generating unit 1, a second signal having a phase ahead of the local signal by 90°, a third signal having a phase ahead of the local signal by 180°, and a fourth signal having a phase ahead of the local signal by 270°.

Upon generating the first signal, the second signal, the third signal, and the fourth signal, the four-phase signal generating circuit 81 outputs the second signal and the fourth signal to the first signal output circuit 82, and outputs the first signal and the third signal to the second signal output circuit 83.

For example, when the transceiver is in mode (1), upon receiving a control signal indicating that the second signal is to be output from the TX control unit 50, the first signal output circuit 82 outputs the second signal to the frequency converter 24 as the first transmission local signal.

When the transceiver is in mode (1), the second transmission local signal output from the terminal b of the 90° phase difference generating unit 23 has a phase ahead of the first transmission local signal output from the terminal a by 90°.

Therefore, when the transceiver is in mode (1), under a condition that the second signal is output from the first signal output circuit 82 to the frequency converter 24, the second signal output circuit 83 receives a control signal indicating that the third signal having a phase ahead of the local signal by 180° is to be output from the TX control unit 50.

Upon receiving the control signal indicating that the third signal is to be output from the TX control unit 50, the second signal output circuit 83 outputs the third signal to the frequency converter 25 as the second transmission local signal.

Here, the example has been illustrated in which the first signal output circuit 82 receives a control signal indicating that the second signal is to be output from the TX control unit 50 when the transceiver is in mode (1). However, when the transceiver is in mode (1), the first signal output circuit 82 may receive a control signal indicating that the fourth signal is to be output from the TX controller 50.

In this case, the first signal output circuit 82 outputs the fourth signal to the frequency converter 24 as the first transmission local signal.

In addition, the second signal output circuit 83 outputs the first signal having a phase ahead of the fourth signal by 90° to the frequency converter 25 as the second transmission local signal.

For example, when the transceiver is in mode (2), upon receiving a control signal indicating that the second signal is to be output from the TX control unit 50, the first signal output circuit 82 outputs the second signal to the frequency converter 24 as the first transmission local signal.

When the transceiver is in mode (2), the second transmission local signal output from the terminal b of the 90° phase difference generating unit 23 has a phase behind the first transmission local signal output from the terminal a by 90°.

Therefore, when the transceiver is in mode (2), under a condition that the second signal is output from the first signal output circuit 82 to the frequency converter 24, the second signal output circuit 83 receives a control signal indicating that the first signal having the same phase as the local signal is to be output from the TX control unit 50.

Upon receiving a control signal indicating that the first signal is to be output from the TX control unit 50, the second signal output circuit 83 outputs the first signal to the frequency converter 25 as the second transmission local signal.

Here, the example has been illustrated in which the first signal output circuit 82 receives a control signal indicating that the second signal is to be output from the TX control unit 50 when the transceiver is in mode (2). However, when the transceiver is in mode (2), the first signal output circuit 82 may receive a control signal indicating that the fourth signal is to be output from the TX controller 50.

In this case, the first signal output circuit 82 outputs the fourth signal to the frequency converter 24 as the first transmission local signal.

In addition, the second signal output circuit 83 outputs the third signal having a phase behind the fourth signal by 90° to the frequency converter 25 as the second transmission local signal.

As is apparent from the above, according to the fifth embodiment, the 90° phase difference generating unit 23 includes the four-phase signal generating circuit 81, the first signal output circuit 82, and the second signal output circuit 83, and therefore it is possible to achieve the functions of the quadrature modulators 3, 3-1, and 3-2 in FIGS. 1 to 5.

In the fifth embodiment, the example is illustrated in which the four-phase signal generating circuit 81 outputs the second signal and the fourth signal to the first signal output circuit 82, and outputs the first signal and the third signal to the second signal output circuit 83. However, the four-phase signal generating circuit 81 may output the first signal and the third signal to the first signal output circuit 82 and may output the second signal and the fourth signal to the second signal output circuit 83.

In this case, the first signal output circuit 82 outputs the first signal or the third signal to the frequency converter 24 as the first transmission local signal on the basis of the control signal of the TX control unit 50.

In addition, the second signal output circuit 83 outputs the second signal or the fourth signal to the frequency converter 25 as the second transmission local signal on the basis of the control signal of the TX control unit 50.

Sixth Embodiment

In a sixth embodiment, the internal configuration of the 90° phase difference generating unit 37 in the quadrature demodulator 4 in FIG. 2 will be described.

Figure 7:
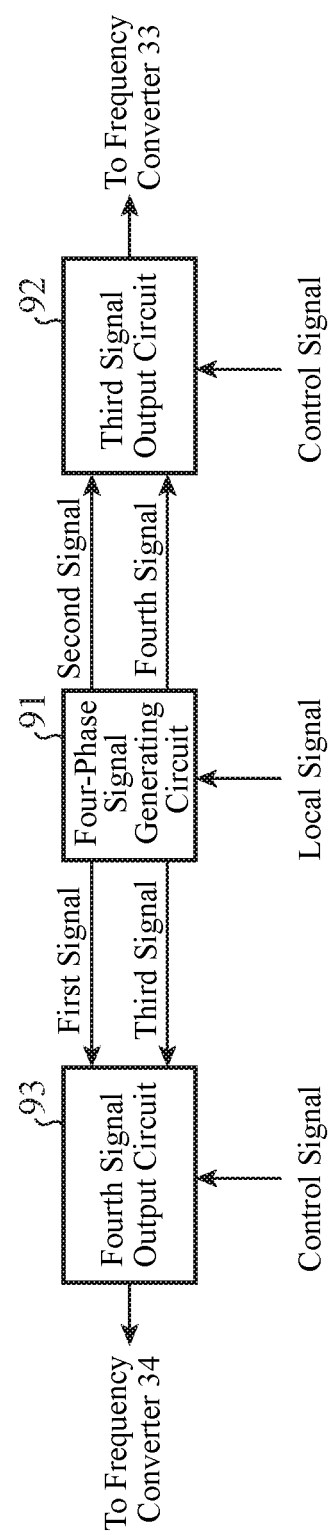
FIG. 7 is a configuration diagram illustrating a 90° phase difference generating unit 37 of a transceiver according to a sixth embodiment of the present invention.

FIG. 7 is a configuration diagram illustrating a 90° phase difference generating unit 37 of a transceiver according to the sixth embodiment of the present invention.

In FIG. 7, a four-phase signal generating circuit 91 generates a first signal having the same phase as a local signal generated by a local signal generating unit 1, a second signal having a phase ahead of the local signal by 90°, a third signal having a phase ahead of the local signal by 180°, and a fourth signal having a phase ahead of the local signal by 270°.

The four-phase signal generating circuit 91 outputs the second signal and the fourth signal to a third signal output circuit 92, and outputs the first signal and the third signal to a fourth signal output circuit 93.

The third signal output circuit 92 outputs the second signal or the fourth signal output from the four-phase signal generating circuit 91 to a frequency converter 33 as a first reception local signal.

The fourth signal output circuit 93 outputs the first signal or the third signal output from the four-phase signal generating circuit 91 to a frequency converter 34 as a second reception local signal.

The output signals of the third signal output circuit 92 and the fourth signal output circuit 93 are controlled, for example, on the basis of a control signal output from the TX control unit 51.

Next, the operation will be described.

The four-phase signal generating circuit 91 of the 90° phase difference generating unit 37 generates the first signal having the same phase as a local signal generated by the local signal generating unit 1, a second signal having a phase ahead of the local signal by 90°, a third signal having a phase ahead of the local signal by 180°, and a fourth signal having a phase ahead of the local signal by 270°.

Upon generating the first signal, the second signal, the third signal, and the fourth signal, the four-phase signal generating circuit 91 outputs the second signal and the fourth signal to the third signal output circuit 92, and outputs the first signal and the third signal to the fourth signal output circuit 93.

For example, when the transceiver is in mode (11) or (21), upon receiving a control signal indicating that the second signal is to be output from a TX control unit 51, the third signal output circuit 92 outputs the second signal to the frequency converter 33 as the first reception local signal.

When the transceiver is in mode (11) or (21), the second reception local signal output from a terminal b of the 90° phase difference generating unit 37 has a phase ahead of the first reception local signal output from a terminal a by 90°.

Therefore, when the transceiver is in mode (11) or (21), under a condition that the second signal is output from the third signal output circuit 92 to the frequency converter 33, the fourth signal output circuit 93 receives a control signal indicating that the third signal having a phase ahead of the local signal by 180° is to be output from the TX control unit 51.

Upon receiving a control signal indicating that the third signal is to be output from the TX control unit 51, the fourth signal output circuit 93 outputs the third signal to the frequency converter 34 as the second reception local signal.

Here, the example has been illustrated in which the third signal output circuit 92 receives a control signal indicating that the second signal is to be output from the TX control unit 51 when the transceiver is in mode (11) or (21). However, when the transceiver is in mode (11) or (21), the third signal output circuit 92 may receive a control signal indicating that the fourth signal is to be output from the TX controller 51.

In this case, the third signal output circuit 92 outputs the fourth signal to the frequency converter 33 as the first reception local signal.

In addition, the fourth signal output circuit 93 outputs the first signal having a phase ahead of the fourth signal by 90° to the frequency converter 34 as the second reception local signal.

For example, when the transceiver is in mode (12) or (22), upon receiving a control signal indicating that the second signal is to be output from the TX control unit 51, the third signal output circuit 92 outputs the second signal to the frequency converter 33 as the first reception local signal.

When the transceiver is in mode (12) or (22), the second reception local signal output from the terminal b of the 90° phase difference generating unit 37 has a phase behind the first reception local signal output from the terminal a by 90°.

Therefore, when the transceiver is in mode (12) or (22), under a condition that the second signal is output from the third signal output circuit 92 to the frequency converter 33, the fourth signal output circuit 93 receives a control signal indicating that the first signal having the same phase as the local signal is to be output from the TX control unit 51.

Upon receiving a control signal indicating that the first signal is to be output from the TX control unit 51, the fourth signal output circuit 93 outputs the first signal to the frequency converter 34 as the second reception local signal.

Here, the example has been illustrated in which the third signal output circuit 92 receives a control signal indicating that the second signal is to be output from the TX control unit 51 when the transceiver is in mode (12) or (22). However, when the transceiver is in mode (12) or (22), the third signal output circuit 92 may receive a control signal indicating that the fourth signal is to be output from the TX controller 51.

In this case, the third signal output circuit 92 outputs the fourth signal to the frequency converter 33 as the first reception local signal.

In addition, the fourth signal output circuit 93 outputs the third signal having a phase behind the fourth signal by 90° to the frequency converter 34 as the second reception local signal.

As is apparent from the above, according to the sixth embodiment, the 90° phase difference generating unit 37 includes the four-phase signal generating circuit 91, the third signal output circuit 92, and the fourth signal output circuit 93, and therefore it is possible to achieve the functions of the quadrature modulator 3 in FIG. 2.

In the sixth embodiment, the example is illustrated in which the four-phase signal generating circuit 91 outputs the second signal and the fourth signal to the third signal output circuit 92, and outputs the first signal and the third signal to the fourth signal output circuit 93. However, the four-phase signal generating circuit 91 may output the first signal and the third signal to the third signal output circuit 92 and may output the second signal and the fourth signal to fourth signal output circuit 93.

In this case, the third signal output circuit 92 outputs the first signal or the third signal to the frequency converter 33 as the first reception local signal on the basis of the control signal of the TX control unit 51.

In addition, the fourth signal output circuit 93 outputs the second signal or the fourth signal to the frequency converter 34 as the second reception local signal according to the control signal of the TX control unit 51.

Note that the present invention can freely combine the embodiments to each other, modify any constituent element in each of the embodiments, or omit any constituent element in each of the embodiments within the scope of the invention.

INDUSTRIAL APPLICABILITY

The present invention is suitable for a transceiver for transmitting and receiving a high frequency signal.

REFERENCE SIGNS LIST

1: Local signal generating unit, 2, 2-1, 2-2: Transmission baseband unit, 3, 3-1, 3-2: Quadrature modulator, 4: Quadrature demodulator, 5: Reception baseband unit, 11: TXI signal generating unit, 12: TXQ signal generating unit, 13: First signal exchanger, 14: TXISW (first path switching unit), 15: TXQSW (second path switching unit), 16: D/A converter (first digital-analog converting unit), 17: D/A converter (second digital-analog converting unit), 21: Signal path (first path), 22: Signal path (second path), 23: 90° Phase difference generating unit (first phase difference generating unit), 24: Frequency converter (first frequency converter), 25: Frequency converter (second frequency converter), 26: Signal synthesis unit, 31: Branching unit, 32: 90° Phase difference generating unit (second phase difference generating unit), 33: Frequency converter (third frequency converter), 34: Frequency converter (fourth frequency converter), 35: Signal path (third path), 36: Signal path (fourth path), 37: 90° Phase difference generating unit (second phase difference generating unit), 41: A/D converter (first analog-digital converting unit), 42: A/D converter (second analog-digital converting unit), 43: RXQ signal processing unit (first signal measuring unit), 44: RXQ signal processing unit (second signal measuring unit), 45: Second signal exchanger, 46: RXISW (third path switching unit), 47: RXQSW (fourth path switching unit), 50, 51: TX control unit (control unit), 61: Delay wire, 62: Phase correcting unit, 63: Phase shifter control unit, 64: Phase shifter, 70: Signal selecting unit, 81: Four-phase signal generating circuit, 82: First signal output circuit, 83: Second signal output circuit, 91: Four-phase signal generating circuit, 92: Third signal output circuit, 93: Fourth signal output circuit.

The invention claimed is:
1. A transceiver comprising:
a local signal generator that generates a local signal;
a transmission baseband unit that generates a transmission I-phase signal and a transmission Q-phase signal of a transmission wave, outputs the transmission I-phase signal to a first path, and outputs the transmission Q-phase signal to a second path;

a quadrature modulator that performs quadrature modulation on the transmission I-phase signal that has passed through the first path and the transmission Q-phase signal that has passed through the second path using the local signal and generates a high frequency signal from the transmission I-phase signal after the quadrature modulation and the transmission Q-phase signal after the quadrature modulation;

a quadrature demodulator that performs quadrature demodulation on the high frequency signal using the local signal to generate a reception I-phase signal and a reception Q-phase signal, outputs the reception I-phase signal to a third path, and outputs the reception Q-phase signal to a fourth path;

a reception baseband unit that measures the reception I-phase signal that has passed through the third path and the reception Q-phase signal that has passed through the fourth path;

a first signal exchanger that exchanges the transmission I-phase signal and the transmission Q-phase signal output from the transmission baseband unit to the first and the second paths; and a controller that controls generation of the transmission I-phase signal and the transmission Q-phase signal in the transmission baseband unit on a basis of a measurement result of the reception baseband unit before and after exchange of the signals by the first signal exchanger.

2. The transceiver according to claim 1, wherein
the controller controls an amplitude and a phase of the transmission I-phase signal generated by the transmission baseband unit and an amplitude and a phase of the transmission Q-phase signal generated by the transmission baseband unit so that a frequency characteristic of an amplitude and a frequency characteristic of a passing phase of the transmission I-phase signal after quadrature modulation by the quadrature modulator match a frequency characteristic of an amplitude and a frequency characteristic of a passing phase of the transmission Q-phase signal after quadrature modulation by the quadrature modulator on a basis of the measurement result of the reception baseband unit before and after exchange of the signals by the first signal exchanger.

3. The transceiver according to claim 1, comprising a second signal exchanger that exchanges the reception I-phase signal and the reception Q-phase signal output from the third and fourth paths to the reception baseband unit, wherein
the reception baseband unit measures the reception I-phase signal that has passed through the fourth path and measures the reception Q-phase signal that has passed through the third path when the reception I-phase signal and the reception Q-phase signal are switched by the second signal exchanger, and
the controller controls generation of the transmission I-phase signal and the transmission Q-phase signal in the transmission baseband unit on a basis of a measurement result of the reception baseband unit before and after exchange of the signals by the second signal exchanger.

4. The transceiver according to claim 3, wherein
the controller controls an amplitude and a phase of the transmission I-phase signal generated by the transmission baseband unit and an amplitude and a phase of the transmission Q-phase signal generated by the transmission baseband unit so that a frequency characteristic of an amplitude and a frequency characteristic of a passing phase of the reception I-phase signal that has passed through the third path match a frequency characteristic of an amplitude and a frequency characteristic of a passing phase of the reception Q-phase signal that has passed through the fourth path on a basis of the measurement result of the reception baseband unit before and after exchange of the signals by the second signal exchanger.

5. The transceiver according to claim 1, comprising a phase corrector that specifies a phase shift amount corresponding to a phase difference between a local signal supplied from the local signal generator to the quadrature modulator and a local signal supplied from the local signal generator to the quadrature demodulator from the measurement result of the reception baseband unit, and correcting a phase of the local signal supplied to the quadrature modulator or a phase of the local signal supplied to the quadrature demodulator on a basis of the phase shift amount.

6. The transceiver according to claim 1,
having a plurality of sets of the transmission baseband unit and the quadrature modulator mounted thereon, and
comprising a signal selector that selects any one of high frequency signals generated by the plurality of quadrature modulators and outputting the selected high frequency signal to the quadrature demodulator, wherein
the controller controls generation of the transmission I-phase signal and the transmission Q-phase signal in the transmission baseband unit for generating the transmission I-phase signal and the transmission Q-phase signal as a generation source of the high frequency signal selected by the signal selector on a basis of the measurement result of the reception baseband unit before and after exchange of the signals by the first signal exchanger.

7. The transceiver according to claim 1, wherein
the transmission baseband unit includes the first signal exchanger,
the transmission baseband unit includes:
a transmission I-phase signal generator that generating a transmission I-phase signal of a transmission wave;
a transmission Q-phase signal generator that generates a transmission Q-phase signal of the transmission wave;
a first digital-analog converter that converts the transmission I-phase signal generated by the transmission I-phase signal generator or the transmission Q-phase signal generated by the transmission Q-phase signal generator from a digital signal into an analog signal and outputting the analog signal to the first path; and
a second digital-analog converter that converts the transmission Q-phase signal generated by the transmission Q-phase signal generator or the transmission I-phase signal generated by the transmission I-phase signal generator from a digital signal into an analog signal and outputting the analog signal to the second path, and
the first signal exchanger includes:
a first path switcher that outputs the transmission I-phase signal generated by the transmission I-phase signal generator to the first digital-analog converter or the second digital-analog converter; and
a second path switcher that outputs the transmission Q-phase signal generated by the transmission Q-phase signal generator to the second digital-analog converter or the first digital-analog converter.

8. The transceiver according to claim 1, wherein
the quadrature modulator includes:
a first phase difference generator that generates, from a local signal generated by the local signal generator, a first transmission local signal and a second transmission local signal having a phase difference of 90° from each other;
a first frequency converter that converts a frequency of the transmission I-phase signal that has passed through the first path using the first transmission local signal;
a second frequency converter that converts a frequency of the transmission Q-phase signal that has passed through the second path using the second transmission local signal; and
a signal synthesizer that generates a high frequency signal by synthesizing the transmission I-phase signal having a frequency converted by the first frequency converter with the transmission Q-phase signal having a frequency converted by the second frequency converter.

9. The transceiver according to claim 1, wherein
the quadrature demodulator includes:
a second phase difference generator that generates, from a local signal generated by the local signal generator, a first reception local signal and a second reception local signal having a phase difference of 90° from each other;
a signal brancher that branches a high frequency signal generated by the quadrature modulator;
a third frequency converter that performs quadrature demodulation on the reception I-phase signal from one high frequency signal branched by the signal brancher using the first reception local signal and outputs the reception I-phase signal on which quadrature demodulation has been performed to the third path; and
a fourth frequency converter that performs quadrature demodulation on the reception Q-phase signal from the other high frequency signal branched by the signal brancher using the second reception local signal and outputs the reception Q-phase signal on which quadrature demodulation has been performed to the fourth path.

10. The transceiver according to claim 3, wherein
the quadrature demodulator includes:
a second phase difference generator that generates, from a local signal generated by the local signal generator, a first reception local signal and a second reception local signal having a phase difference of 90° from each other;
a signal brancher that branches a high frequency signal generated by the quadrature modulator;
a third frequency converter that performs quadrature demodulation on the reception I-phase signal or the reception Q-phase signal from one high frequency signal branched by the signal brancher using the first reception local signal and outputs the reception I-phase signal on which quadrature demodulation has been performed or the reception Q-phase signal on which quadrature demodulation has been performed to the third path; and
a fourth frequency converter that performs quadrature demodulation on the reception Q-phase signal or the reception I-phase signal from the other high frequency signal branched by the signal brancher using the second reception local signal and outputs the reception Q-phase signal on which quadrature demodulation has been performed or the reception I-phase signal on which quadrature demodulation has been performed to the fourth path.

11. The transceiver according to claim 3, wherein
the reception baseband unit includes the second signal exchanger,
the reception baseband unit includes:
a first analog-digital converter that converts the reception I-phase signal or the reception Q-phase signal that has passed through the third path from an analog signal into a digital signal;
a second analog-digital converter that converts the reception Q-phase signal or the reception I-phase signal that has passed through the fourth path from an analog signal into a digital signal;
a first signal measurer that measures the reception I-phase signal converted into a digital signal by the first analog-digital converter or the reception I-phase signal converted into a digital signal by the second analog-digital converter; and
a second signal measurer that measures the reception Q-phase signal converted into a digital signal by the second analog-digital converter or the reception Q-phase signal converted into a digital signal by the first analog-digital converter, and
the second signal exchanger includes:
a third path switcher that outputs the reception I-phase signal converted by the first analog-digital converter or the reception I-phase signal converted by the second analog-digital converter to the first signal measurer; and
a fourth path switcher that outputs the reception Q-phase signal converted by the second analog-digital converter or the reception Q-phase signal converted by the first analog-digital converter to the second signal measurer.

12. The transceiver according to claim 8, wherein
the first phase difference generator includes:
a four-phase signal generating circuit that generates a first signal having the same phase as a local signal generated by the local signal generator, a second signal having a phase ahead of the local signal by 90°, a third signal having a phase ahead of the local signal by 180°, and a fourth signal having a phase ahead of the local signal by 270°;
a first signal output circuit that outputs the second signal or the fourth signal generated by the four-phase signal generating circuit or the first signal or the third signal generated by the four-phase signal generating circuit to the first frequency converter as the first transmission local signal; and
a second signal output circuit that outputs the first signal or the third signal to the second frequency converter as the second transmission local signal when the second signal or the fourth signal is output from the first signal output circuit as the first transmission local signal, and outputs the second signal or the fourth signal to the second frequency converter as the second transmission local signal when the first signal or the third signal is output from the first signal output circuit as the first transmission local signal.

13. The transceiver according to claim 9, wherein
the second phase difference generator includes:
a four-phase signal generating circuit that generates a first signal having the same phase as a local signal generated by the local signal generator, a second signal having a phase ahead of the local signal by 90°, a third signal having a phase ahead of the local signal by 180°, and a fourth signal having a phase ahead of the local signal by 270°;
a third signal output circuit that outputs the second signal or the fourth signal generated by the four-phase signal generating circuit or the first signal or the third signal generated by the four-phase signal generating circuit to the third frequency converter as the first reception local signal; and a fourth signal output circuit that outputs the first signal or the third signal to the fourth frequency converter as the second reception local signal when the second signal or the fourth signal is output from the third signal output circuit as the first reception local signal, and outputting the second signal or the fourth signal to the fourth frequency converter as the second reception local signal when the first signal or the third signal is output from the third signal output circuit as the first reception local signal.

* * * * *